US011711826B2

(12) United States Patent
Zhu et al.

(10) Patent No.: US 11,711,826 B2
(45) Date of Patent: Jul. 25, 2023

(54) ON-DEMAND MULTICAST CONTROL CHANNEL MESSAGES

(71) Applicant: QUALCOMM Incorporated, San Diego, CA (US)

(72) Inventors: Xipeng Zhu, San Diego, CA (US); Prasad Reddy Kadiri, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 28 days.

(21) Appl. No.: 17/141,206

(22) Filed: Jan. 4, 2021

(65) Prior Publication Data

US 2021/0289471 A1    Sep. 16, 2021

Related U.S. Application Data

(60) Provisional application No. 62/989,373, filed on Mar. 13, 2020.

(51) Int. Cl.
*H04W 56/00*     (2009.01)
*H04W 72/30*     (2023.01)
(Continued)

(52) U.S. Cl.
CPC ........... *H04W 72/30* (2023.01); *H04W 24/08* (2013.01); *H04W 72/0446* (2013.01);
(Continued)

(58) Field of Classification Search
CPC ... H04W 72/005; H04W 76/27; H04W 24/08; H04W 72/042; H04W 72/0446; H04W 72/0486; H04W 74/0833
(Continued)

(56) References Cited

U.S. PATENT DOCUMENTS

2006/0068793 A1 * 3/2006 Van Lieshout ..... H04W 72/005
                                                       455/444
2016/0323784 A1 * 11/2016 Ma ...................... H04W 72/042
(Continued)

FOREIGN PATENT DOCUMENTS

EP            3487249 A1    5/2019
WO    WO-2018094252 A1    5/2018

OTHER PUBLICATIONS

"3rd Generation Partnership Project, Technical Specification Group Radio Access Network, Evolved Universal Terrestrial Radio Access (E-UTRA), Radio Resource Control (RRC), Protocol Specification (Release 16)", 3GPP Draft, Draft, 36331-G00, V24, 3rd Generation Partnership Project (3GPP), Mobile Competence Centre, 650, Route Des Lucioles, F-06921 Sophia-Antipolis Cedex, France, Feb. 12, 2020 (Feb. 12, 2020), XP051847058, 1023 Pages, Retrieved from the Internet: URL: https://ftp.3gpp.org/Email_Discussions/RAN2/%5BRAN2%23108%5D/%5B108%2328%5D%5BR16%20RRC%5D%20RRC%20Merge/36331/Draft_36331-g00_v24.docx. [Retrieved on Feb. 12, 2020] p. 291-p. 294.
(Continued)

*Primary Examiner* — Sai Ming Chan
(74) *Attorney, Agent, or Firm* — Holland & Hart LLP

(57) ABSTRACT

Methods, systems, and devices for on-demand multicast control channel (MCCH) messages are described. A user equipment (UE) may receive, from a base station, system information indicating an MCCH message configuration. Based on receiving the MCCH message configuration, the UE may transmit a request for an MCCH message. For example, the UE may transmit the request for the MCCH message by a random access preamble or a radio resource control (RRC) message. After transmitting the request, the UE may receive the MCCH message in accordance with the MCCH message configuration. That is, the base station may receive the request and transmit the MCCH message in
(Continued)

response to the request. The MCCH message may indicate a multicast service radio bearer (MRB) configuration for receiving multicast traffic. Thus, the UE may receive multicast traffic from the base station in accordance with the MRB configuration.

30 Claims, 19 Drawing Sheets

(51) Int. Cl.
  *H04W 72/0446* (2023.01)
  *H04W 24/08* (2009.01)
  *H04W 76/27* (2018.01)
  *H04W 74/08* (2009.01)
  *H04W 72/23* (2023.01)
  *H04W 72/52* (2023.01)

(52) U.S. Cl.
  CPC ........... *H04W 72/23* (2023.01); *H04W 72/52* (2023.01); *H04W 74/0833* (2013.01); *H04W 76/27* (2018.02)

(58) Field of Classification Search
  USPC .......................................................... 370/329
  See application file for complete search history.

(56) References Cited

U.S. PATENT DOCUMENTS

2018/0199163 A1    7/2018  Chen et al.
2019/0182633 A1*   6/2019  Wang ................ H04W 52/0229
2019/0349971 A1*  11/2019  Yu ..................... H04W 72/1273

OTHER PUBLICATIONS

International Search Report and Written Opinion—PCT/US2021/021925—ISA/EPO—dated Jul. 13, 2021.

* cited by examiner

ON-DEMAND MULTICAST CONTROL CHANNEL MESSAGES

CROSS REFERENCE

The present Application for Patent claims the benefit of U.S. Provisional Patent Application No. 62/989,373 by ZHU et al., entitled "ON-DEMAND MULTICAST CONTROL CHANNEL MESSAGES," filed Mar. 13, 2020, assigned to the assignee hereof, and expressly incorporated by reference herein.

FIELD OF TECHNOLOGY

The following relates generally to wireless communications and more specifically to on-demand multicast control channel (MCCH) messages.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may receive broadcast or multicast traffic from a base station via a multicast service radio bearer (MRB). The UE may determine the MRB configuration for receiving the multicast traffic from the base station based on receiving a multicast control channel (MCCH) message indicating the MRB configuration.

SUMMARY

The described techniques relate to improved methods, systems, devices, and apparatuses that support on-demand multicast control channel (MCCH) messages. Generally, a user equipment (UE) may receive a system information block (SIB) from a base station indicating an MCCH message configuration. Based on receiving the indication of the MCCH message configuration, the UE may transmit a request for the MCCH message to the base station. In one example, the UE may transmit the request for the MCCH message to the base station by a random access preamble. Here, the UE may receive a random access response (RAR) message from the base station and the UE may then monitor a physical downlink control channel (PDCCH) for the MCCH message. In another example, the UE may transmit the request for the MCCH message to the base station by a radio resource control (RRC) message. Here, the UE may then monitor the PDCCH for the MCCH message. Additionally or alternatively, the UE may receive the MCCH message by an RRC message received from the base station. In either example, the MCCH message may indicate a configuration for a multicast service radio bearer (MRB) associated with multicast traffic from the base station. The UE may then receive multicast traffic from the base station in accordance with the MRB configuration.

A method of wireless communication at a UE is described. The method may include receiving, from a base station, system information indicating an MCCH message configuration, transmitting, to the base station, a request for an MCCH message, receiving, in accordance with the MCCH message configuration and in response to transmission of the request, the MCCH message which is indicative of a MRB configuration, and receiving multicast traffic from the base station in accordance with the MRB configuration.

An apparatus for wireless communication at a UE is described. The apparatus may include a processor, memory coupled with the processor, and instructions stored in the memory. The instructions may be executable by the processor to cause the apparatus to receive, from a base station, system information indicating an MCCH message configuration, transmit, to the base station, a request for an MCCH message, receive, in accordance with the MCCH message configuration and in response to transmission of the request, the MCCH message which is indicative of a MRB configuration, and receive multicast traffic from the base station in accordance with the MRB configuration.

Another apparatus for wireless communication at a UE is described. The apparatus may include means for receiving, from a base station, system information indicating an MCCH message configuration, transmitting, to the base station, a request for an MCCH message, receiving, in accordance with the MCCH message configuration and in response to transmission of the request, the MCCH message which is indicative of a MRB configuration, and receiving multicast traffic from the base station in accordance with the MRB configuration.

A non-transitory computer-readable medium storing code for wireless communication at a UE is described. The code may include instructions executable by a processor to receive, from a base station, system information indicating an MCCH message configuration, transmit, to the base station, a request for an MCCH message, receive, in accordance with the MCCH message configuration and in response to transmission of the request, the MCCH message which is indicative of a MRB configuration, and receive multicast traffic from the base station in accordance with the MRB configuration.

In some examples of the method, apparatuses, and non-transitory computer-readable medium described herein, transmitting the request for the MCCH message further may include operations, features, means, or instructions for transmitting the request by a random access preamble to the base station within a random access occasion indicated by an MCCH message request configuration within the system information.

Some examples of the method, apparatuses, and non-transitory computer-readable medium described herein may further include operations, features, means, or instructions for receiving a RAR message from the base station, where receiving the MCCH message may be based on receiving the RAR message.

Some examples of the method, apparatuses, and non-transitory computer-readable medium described herein may further include operations, features, means, or instructions for determining to transmit the request by the random access preamble based on the system information including the MCCH message request configuration.

In some examples of the method, apparatuses, and non-transitory computer-readable medium described herein, transmitting the request for the MCCH message further may include operations, features, means, or instructions for transmitting the request by a RRC request message.

In some examples of the method, apparatuses, and non-transitory computer-readable medium described herein, the RRC request message may be included within a RRC system information request, a RRC MCCH request, or a payload of a first random access message of a two-step random access procedure.

In some examples of the method, apparatuses, and non-transitory computer-readable medium described herein, receiving the MCCH message further may include operations, features, means, or instructions for receiving the MCCH message by a RRC configuration message responsive to the RRC request message.

Some examples of the method, apparatuses, and non-transitory computer-readable medium described herein may further include operations, features, means, or instructions for determining to transmit the request by the RRC request message based on an absence of an MCCH message request configuration within the system information.

In some examples of the method, apparatuses, and non-transitory computer-readable medium described herein, the system information indicates an MCCH message request configuration, and transmitting the request further may include operations, features, means, or instructions for transmitting the request in accordance with the MCCH message request configuration.

In some examples of the method, apparatuses, and non-transitory computer-readable medium described herein, the MCCH message request configuration includes at least one of an indication of a time period for transmitting the request or resources for transmitting the request.

Some examples of the method, apparatuses, and non-transitory computer-readable medium described herein may further include operations, features, means, or instructions for monitoring a PDCCH for the MCCH message in accordance with the MCCH message configuration, where receiving the MCCH message may be based on monitoring the PDCCH.

In some examples of the method, apparatuses, and non-transitory computer-readable medium described herein, monitoring the PDCCH further may include operations, features, means, or instructions for monitoring a control resource set of the PDCCH indicated by the system information.

In some examples of the method, apparatuses, and non-transitory computer-readable medium described herein, the control resource set may be associated with a monitoring time window, a monitoring period, a monitoring offset, or a combination thereof.

In some examples of the method, apparatuses, and non-transitory computer-readable medium described herein, the MCCH message may be associated with a set of delay sensitive MRB configurations including the MRB configuration.

In some examples of the method, apparatuses, and non-transitory computer-readable medium described herein, the MCCH message may be associated with a set of MRB configurations that may be delay insensitive, and the set of MRB configurations includes the MRB configuration.

Some examples of the method, apparatuses, and non-transitory computer-readable medium described herein may further include operations, features, means, or instructions for transmitting the request for the MCCH message may be based on the system information indicating that the MCCH message may be to be received on-demand.

Some examples of the method, apparatuses, and non-transitory computer-readable medium described herein may further include operations, features, means, or instructions for determining a service group associated with the multicast traffic, where receiving the MCCH message may be based on the determined service group.

In some examples of the method, apparatuses, and non-transitory computer-readable medium described herein, determining the service group further may include operations, features, means, or instructions for determining a service group identifier associated with the service group based on a MRB context or a multicast broadcast service identifier.

In some examples of the method, apparatuses, and non-transitory computer-readable medium described herein, the MCCH message includes both an on-demand MCCH message and a periodic MCCH message.

Some examples of the method, apparatuses, and non-transitory computer-readable medium described herein may further include operations, features, means, or instructions for performing a cell reselection procedure from a first base station to a second base station, where the base station may be the first base station, determining that the second base station transmits the multicast traffic in accordance with the MRB configuration based on a same area identifier being associated with a first MCCH message and a second MCCH message associated with the second base station, where the MCCH message may be the first MCCH message, and determining to refrain from monitoring for system information from the second base station based on determining that the second base station transmits the multicast traffic in accordance with the MRB configuration.

In some examples of the method, apparatuses, and non-transitory computer-readable medium described herein, the system information includes an indication of the area identifier.

Some examples of the method, apparatuses, and non-transitory computer-readable medium described herein may further include operations, features, means, or instructions for determining to perform a cell reselection procedure from a first base station, where the base station may be a second base station, receiving an initial multicast control message from the first base station based on determining to perform the cell reselection procedure, determining that the second base station transmits the multicast traffic based on the initial multicast control message, and performing the cell reselection procedure from the first base station to the second base station based on determining that the second base station transmits the multicast traffic, where receiving the system information may be based on performing the cell reselection procedure.

Some examples of the method, apparatuses, and non-transitory computer-readable medium described herein may further include operations, features, means, or instructions for receiving the system information may be based on the UE performing a cell reselection procedure, the UE performing a cell selection procedure, the UE performing a handover procedure, a change associated with the MCCH message, or a combination thereof.

In some examples of the method, apparatuses, and non-transitory computer-readable medium described herein, the MCCH message configuration includes at least one of an indication of a search space associated with the MCCH message or a time period for receiving the MCCH message.

In some examples of the method, apparatuses, and non-transitory computer-readable medium described herein, the MRB configuration may be a multicast/broadcast service radio bearer configuration, and the multicast traffic may be multicast/broadcast traffic.

In some examples of the method, apparatuses, and non-transitory computer-readable medium described herein, the MCCH message configuration includes an indication of a repetition period of the MCCH message, an identifier associated with the multicast traffic, one or more slots associated with the MCCH message, a modification period associated with the MCCH message, a new service start, or a combination thereof.

A method of wireless communication at a base station is described. The method may include transmitting, to a UE, system information indicating an MCCH message configuration, receiving, from the UE, a request for an MCCH message, transmitting, in accordance with the MCCH message configuration and in response to receipt of the request, the MCCH message which is indicative of a MRB configuration, and transmitting multicast traffic to the UE in accordance with the MRB configuration.

An apparatus for wireless communication at a base station is described. The apparatus may include a processor, memory coupled with the processor, and instructions stored in the memory. The instructions may be executable by the processor to cause the apparatus to transmit, to a UE, system information indicating an MCCH message configuration, receive, from the UE, a request for an MCCH message, transmit, in accordance with the MCCH message configuration and in response to receipt of the request, the MCCH message which is indicative of a MRB configuration, and transmit multicast traffic to the UE in accordance with the MRB configuration.

Another apparatus for wireless communication at a base station is described. The apparatus may include means for transmitting, to a UE, system information indicating an MCCH message configuration, receiving, from the UE, a request for an MCCH message, transmitting, in accordance with the MCCH message configuration and in response to receipt of the request, the MCCH message which is indicative of a MRB configuration, and transmitting multicast traffic to the UE in accordance with the MRB configuration.

A non-transitory computer-readable medium storing code for wireless communication at a base station is described. The code may include instructions executable by a processor to transmit, to a UE, system information indicating an MCCH message configuration, receive, from the UE, a request for an MCCH message, transmit, in accordance with the MCCH message configuration and in response to receipt of the request, the MCCH message which is indicative of a MRB configuration, and transmit multicast traffic to the UE in accordance with the MRB configuration.

In some examples of the method, apparatuses, and non-transitory computer-readable medium described herein, receiving the request for the MCCH message further may include operations, features, means, or instructions for receiving the request by a random access preamble from the UE within a random access occasion indicated by an MCCH message request configuration within the system information.

Some examples of the method, apparatuses, and non-transitory computer-readable medium described herein may further include operations, features, means, or instructions for transmitting a RAR message to the UE, where transmitting the MCCH message may be based on receiving the RAR message.

In some examples of the method, apparatuses, and non-transitory computer-readable medium described herein, the request may be received by the random access preamble based on the system information including the MCCH message request configuration.

In some examples of the method, apparatuses, and non-transitory computer-readable medium described herein, receiving the request for the MCCH message further may include operations, features, means, or instructions for receiving the request by a RRC request message.

In some examples of the method, apparatuses, and non-transitory computer-readable medium described herein, the RRC request message may be included within a RRC connection request or within a payload of a first random access message of a two-step random access procedure.

In some examples of the method, apparatuses, and non-transitory computer-readable medium described herein, transmitting the MCCH message further may include operations, features, means, or instructions for transmitting the MCCH message by a RRC configuration message responsive to the RRC request message.

In some examples of the method, apparatuses, and non-transitory computer-readable medium described herein, the request may be received by the RRC request message based on an absence of an MCCH message request configuration within the system information.

In some examples of the method, apparatuses, and non-transitory computer-readable medium described herein, the system information indicates an MCCH message request configuration, and receiving the request further may include operations, features, means, or instructions for receiving the request in accordance with the MCCH message request configuration.

In some examples of the method, apparatuses, and non-transitory computer-readable medium described herein, the MCCH message request configuration includes at least one of an indication of a time period for transmission by the UE of the request or resources for transmission by the UE of the request.

In some examples of the method, apparatuses, and non-transitory computer-readable medium described herein, transmitting the MCCH message further may include operations, features, means, or instructions for transmitting the MCCH message by a PDCCH in accordance with the MCCH message configuration.

In some examples of the method, apparatuses, and non-transitory computer-readable medium described herein, transmitting the MCCH message by the PDCCH further may include operations, features, means, or instructions for transmitting the MCCH message within a control resource set indicated by the system information.

In some examples of the method, apparatuses, and non-transitory computer-readable medium described herein, the control resource set may be associated with a monitoring time window, a monitoring period, a monitoring offset, or a combination thereof.

In some examples of the method, apparatuses, and non-transitory computer-readable medium described herein, the MCCH message may be a first MCCH message, and the first MCCH message may be associated with a first set of MRB configurations including at least the MRB configuration.

Some examples of the method, apparatuses, and non-transitory computer-readable medium described herein may further include operations, features, means, or instructions for transmitting a second MCCH message associated with a second set of MRB configurations, where one of the first set of MRB configurations or the second set of MRB configurations may be delay sensitive.

Some examples of the method, apparatuses, and non-transitory computer-readable medium described herein may further include operations, features, means, or instructions for receiving the request for the MCCH message may be based on the system information indicating that the MCCH message may be to be transmitted on-demand.

Some examples of the method, apparatuses, and non-transitory computer-readable medium described herein may further include operations, features, means, or instructions for determining a service group associated with the multicast traffic, where transmitting the MCCH message may be based on the determined service group.

In some examples of the method, apparatuses, and non-transitory computer-readable medium described herein, determining the service group further may include operations, features, means, or instructions for determining a service group identifier associated with the service group based on a MRB context or a multicast broadcast service identifier.

In some examples of the method, apparatuses, and non-transitory computer-readable medium described herein, the MCCH message includes both an on-demand MCCH message and a periodic MCCH message.

Some examples of the method, apparatuses, and non-transitory computer-readable medium described herein may further include operations, features, means, or instructions for transmitting the system information may be based on the UE performing a cell reselection procedure, the UE performing a cell selection procedure, the UE performing a handover procedure, a change associated with the MCCH message, or a combination thereof.

In some examples of the method, apparatuses, and non-transitory computer-readable medium described herein, the MCCH message configuration includes at least one of an indication of a search space associated with the MCCH message or a time period for receiving the MCCH message.

In some examples of the method, apparatuses, and non-transitory computer-readable medium described herein, the MRB configuration may be a multicast/broadcast service radio bearer configuration, and the multicast traffic may be multicast/broadcast traffic.

In some examples of the method, apparatuses, and non-transitory computer-readable medium described herein, the MCCH message configuration includes an indication of a repetition period of the MCCH message, an identifier associated with the multicast traffic, one or more slots associated with the MCCH message, a modification period associated with the MCCH message, a new service start, or a combination thereof.

DETAILED DESCRIPTION

Figure 1:
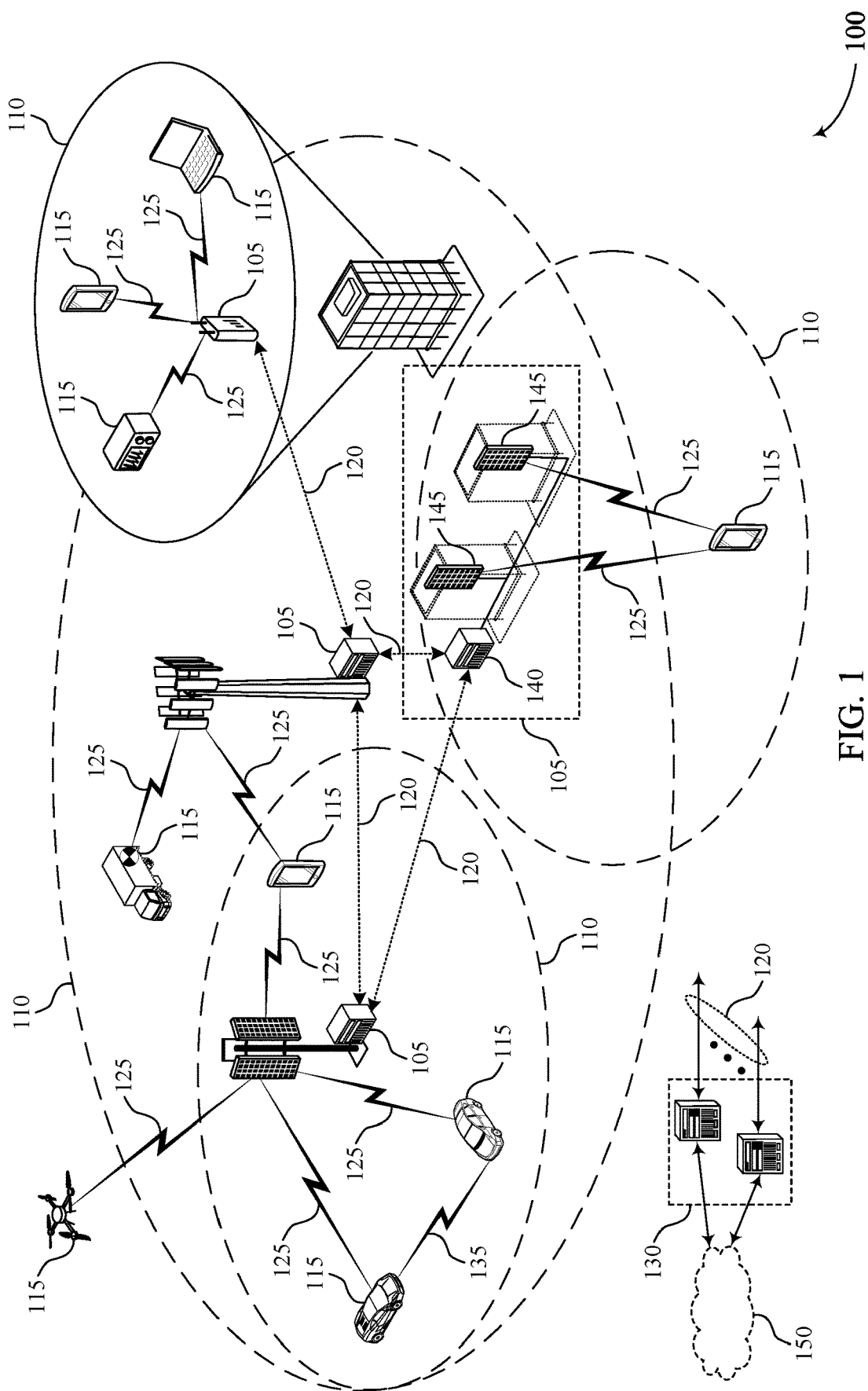
FIG. 1 illustrates an example of a system for wireless communications that supports on-demand multicast control channel (MCCH) messages in accordance with aspects of the present disclosure.

In some wireless communication systems, a base station may transmit multicast traffic to one or more user equipments (UEs) by a multicast service radio bearer (MRB). The base station may indicate a configuration for the MRB within a multicast control channel (MCCH) message. In turn, the base station may indicate the MCCH message configuration by system information transmitted to the one or more UEs. In some cases, the base station may transmit the MCCH message indicating the MRB configuration according to a periodicity defined by the system information. Here, the one or more UEs may monitor a physical downlink control channel (PDCCH) for the MCCH messages transmitted according to the periodicity. In some cases, a UE may begin monitoring the PDCCH for the MCCH message recently after the base station transmits an MCCH message. Here, the UE may monitor the PDCCH for a relatively large amount of time (e.g., when compared to a UE that begins monitoring the PDCCH for the MCCH message less recently after the base station transmits an MCCH message). Thus, there may be a delay associated with the UE receiving the MCCH message due to the periodic MCCH message transmissions. The delay in receiving the MCCH message may additionally introduce latency to the one or more UEs receiving multicast traffic.

In some cases, the base station may transmit the MCCH messages on-demand (e.g., in addition to transmitting the MCCH messages periodically, instead of transmitting the MCCH messages periodically). Here, a UE may transmit a request for the MCCH message and the base station may transmit the MCCH message to the UE in response to the request. As a result, the UE may not monitor the PDCCH for the MCCH message for an extended period of time (e.g., according to the periodicity of the MCCH message) and may instead, receive the MCCH message on-demand. This may decrease a latency associated with receiving the MCCH message and may increase communication speeds associated with the UE and base station. The UE may transmit the request after receiving the system information indicating the MCCH configuration. In one example, the UE may transmit the request for the MCCH message to the base station by a random access preamble. Here, the UE may receive a random access response (RAR) message from the base station and the UE may then monitor the PDCCH for the MCCH message. In another example, the UE may transmit the request for the MCCH to the base station by a radio resource control (RRC) message. Here, the UE may monitor the PDCCH for the MCCH message or may receive the MCCH message by an RRC message received from the base station. In either example, the MCCH message may indicate a configuration for the MRB associated with multicast traffic and the UE may receive the multicast traffic from the base station in accordance with the MRB configuration.

Aspects of the disclosure are initially described in the context of wireless communications systems. Aspects of the disclosure are then described in the context of process flows. Aspects of the disclosure are further illustrated by and described with reference to apparatus diagrams, system diagrams, and flowcharts that relate to on-demand MCCH messages.

FIG. 1 illustrates an example of a wireless communications system 100 that supports on-demand MCCH messages in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In wireless communications system 100, a base station 105 may transmit multicast traffic (e.g., multicast/broadcast traffic) to one or more UEs 115 by an MRB. The base station 105 may indicate a configuration for the MRB within an MCCH message. In turn, the base station 105 may indicate the MCCH message configuration by system information transmitted to the one or more UEs 115. In some cases, the base station 105 may transmit the MCCH message indicating the MRB configuration according to a periodicity defined by the system information. Here, the one or more UEs 115 may monitor a PDCCH for the MCCH messages transmitted according to the periodicity. In some cases, a UE 115 may begin monitoring the PDCCH for the MCCH message recently after the base station 105 transmits an MCCH message. Here, the UE 115 may monitor the PDCCH for a relatively large amount of time (e.g., when compared to a UE 115 that begins monitoring the PDCCH for the MCCH message less recently after the base station 105 transmits an MCCH message). Thus, there may be a delay associated with the UE 115 receiving the MCCH message due to the periodic MCCH message transmissions. The delay in receiving the MCCH message may additionally introduce latency to the one or more UEs 115 receiving multicast traffic.

In some cases, the base station 105 may transmit the MCCH messages on-demand (e.g., in addition to transmitting the MCCH messages periodically, instead of transmitting the MCCH messages periodically). Here, a UE 115 may transmit a request for the MCCH message and the base station 105 may transmit the MCCH message to the UE 115 in response to the request. As a result, the UE 115 may not monitor the PDCCH for the MCCH message for an extended period of time (e.g., according to the periodicity of the MCCH message) and may instead, receive the MCCH message on-demand. This may decrease a latency associated with receiving the MCCH message and may increase communication speeds associated with the UE 115 and base station 105. The UE 115 may transmit the request after receiving the system information indicating the MCCH configuration. In one example, the UE 115 may transmit the request for the MCCH message to the base station 105 by a random access preamble. Here, the UE 115 may receive a RAR message from the base station 105 and the UE 115 may then monitor the PDCCH for the MCCH message. In another example, the UE 115 may transmit the request for the MCCH to the base station 105 by an RRC message. Here, the UE 115 may monitor the PDCCH for the MCCH message or may receive the MCCH message by an RRC message received from the base station 105. In either example, the MCCH message may indicate a configuration for the MRB associated with multicast traffic and the UE 115 may receive the multicast traffic from the base station 105 in accordance with the MRB configuration.

Figure 2:
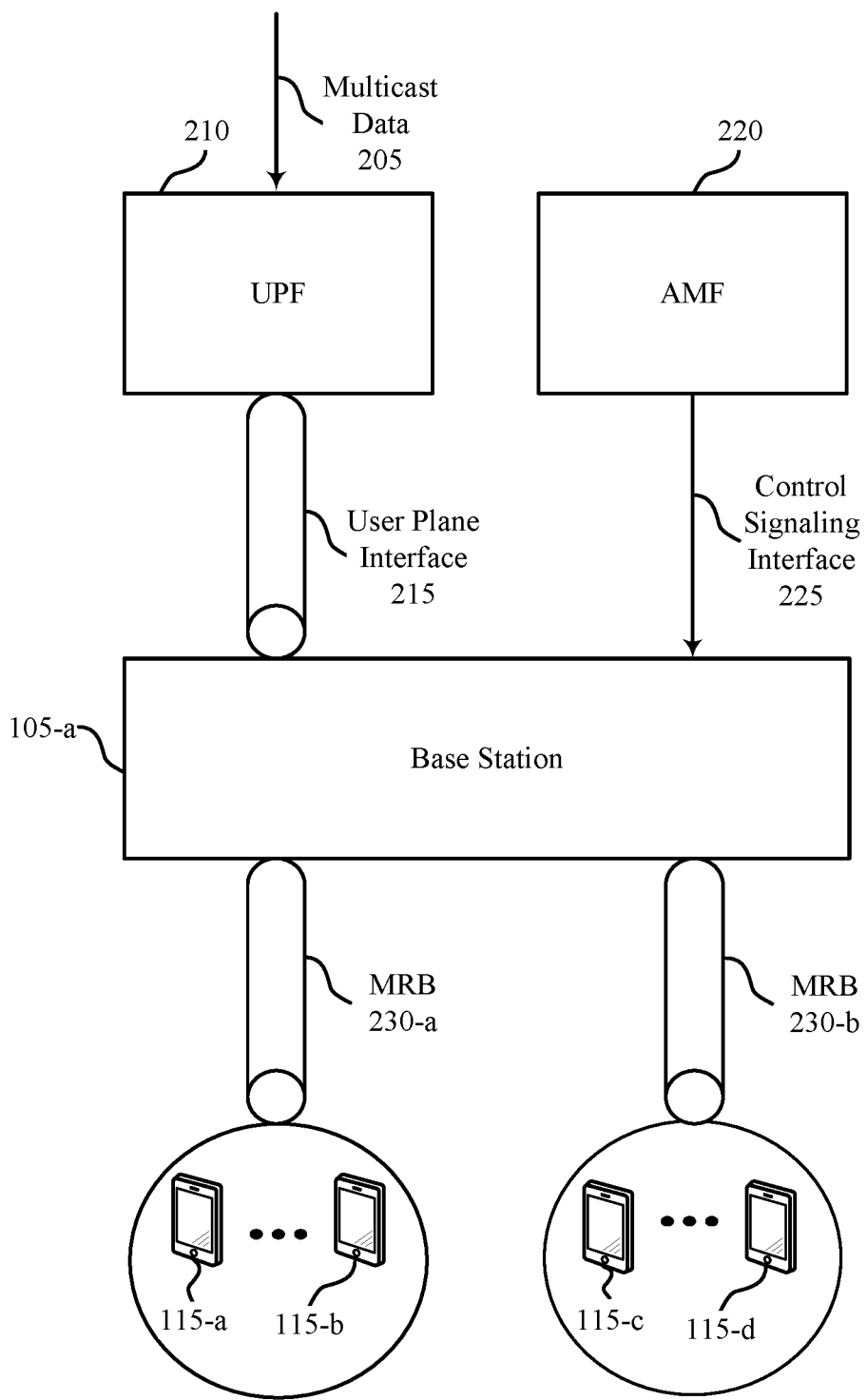
FIG. 2 illustrates an example of a wireless communications system that supports on-demand MCCH messages in accordance with aspects of the present disclosure.

FIG. 2 illustrates an example wireless communications system 200 that supports on-demand MCCH messages in accordance with aspects of the present disclosure. In some examples, the wireless communications system 200 may implement aspects of wireless communications system 100 such as base station 105-a and UEs 115, which may be examples of base stations 105 and UEs 115 as described with reference to FIG. 1.

The base station 105-a may be in communication with a UPF 210 by a user plane interface 215. The UPF 210 may receive multicast data 205 (e.g., from a core network as described with reference to FIG. 1) and communicate the multicast data 205 to the base station 105-a by the user plane interface 215. The user plane interface 215 may be an example of an MB-N3 interface and may be configured for multicast data flow (e.g., multicast/broadcast traffic) and delivering temporary mobile group identifiers (TMGIs) to the base station 105-a over a general packet radio service (GPRS) tunneling protocol (GTP). Additionally, the UPF 210 may transmit multicast data 205 to the base station 105-a identified by a quality of service (QoS) flow (e.g., a 5G QoS flow). The base station 105-a may additionally be in communication with an AMF 220 by a control signaling interface 225. The AMF 220 may provide control signaling for multicast/broadcast-flow, temporary mobile group identity (TMGI) setup, TMGI modification, or a combination thereof.

Based on receiving the multicast data 205, the multicast/broadcast QoS flow, and the control signaling, the base station 105-a may map the multicast data 205 to an MRB 230 or a dedicated radio bearer. That is, if the multicast data 205 is associated with a set of UEs 115 (e.g., a multicast service group), the base station 105-a may select an MRB 230 for transmitting the multicast data 205 as multicast traffic to the UEs 115. Alternatively, if the multicast data 205 is associated with a single UE 115, the base station 105-a may select to transmit the multicast data 205 by a dedicated radio bearer. Thus, the base station 105-a may dynamically switch between broadcasting data (e.g., by the MRBs 230) and unicasting data (e.g., by the dedicated radio bearers). In some cases, the base station 105-a may transmit the multicast data 205 by a physical downlink shared channel (PDSCH) to the one or more UEs 115.

The base station 105-a may transmit multicast traffic one or more UEs 115. Here, the base station 105-a may transmit multicast traffic to a first set of UEs 115 (e.g., including UEs 115-a and 115-b) by the MRB 230-a. Each of the UEs 115 within the first set of UEs 115 may be within a same multicast service group. That is, the base station 105-a may transmit multicast traffic to each of the UEs 115 within the multicast service group by the MRB 230-a. The base station 105-a may also transmit multicast traffic to a second set of UEs 115 (e.g., including UEs 115-c and 115-d) by the MRB 230-b. The second set of UEs 115 may correspond to a second multicast service group. That is, the base station 105-a may transmit multicast traffic to the first multicast service group by MRB 230-a independently of the multicast traffic to the second multicast service group by MRB 230-b. The base station 105-a may configure each multicast service group with a multicast service group identifier. In some cases, the base station 105-a may indicate, to each of the UEs 115 within a multicast service group, the multicast identifier as part of the MRB 230 context. In some other cases, the UEs 115 may derive the multicast service identifier based on the TMGI or a multicast/broadcast flow identifier.

The UEs 115 may receive the multicast traffic by the MRBs 230 in accordance with an MRB 230 configuration. The base station 105-a may indicate the MRB 230 configuration to the UEs 115 by an MCCH message transmission (e.g., by the PDCCH or an RRC message). The base station 105-a may transmit the MCCH messages on-demand (e.g., in addition to transmitting the MCCH messages periodically, instead of transmitting the MCCH messages periodically). Here, a UE 115 may transmit a request for the MCCH message and the base station 105-a may transmit the MCCH message to the UE 115 in response to the request. The UE 115 may transmit the request after receiving the system information indicating the MCCH configuration. In one example, the UE 115 may transmit the request for the MCCH message to the base station 105-a by a random access preamble. Here, the UE 115 may receive a RAR message from the base station 105-a and the UE 115 may then monitor the PDCCH for the MCCH message. In another example, the UE 115 may transmit the request for the MCCH to the base station 105-a by an RRC message. Here, the UE 115 may monitor the PDCCH for the MCCH message or may receive the MCCH message by an RRC message received from the base station 105-*a*. In either example, the MCCH message may indicate a configuration for the MRB 230 associated with multicast traffic and the UE 115 may receive the multicast traffic from the base station 105-*a* in accordance with the MRB 230 configuration.

Each multicast service group may be supported (e.g., served) by a single base station 105-*a* or a set of base stations 105. For example, a multicast service group may be associated with an MCCH area that is served by a set of base stations 105. Here, a UE 115 within a multicast service group may move from one base station 105 to another base station 105 within a same MCCH area and may continue to receive multicast traffic associated with the same multicast service group. That is, the MRB configuration associated with the first base station 105 may also be supported by the second base station 105 within the same MCCH area. Therefore, when a UE 115 moves within an MCCH area, the UE 115 may not need to re-acquire MCCH when handed over to a new base station 105.

Figure 3:
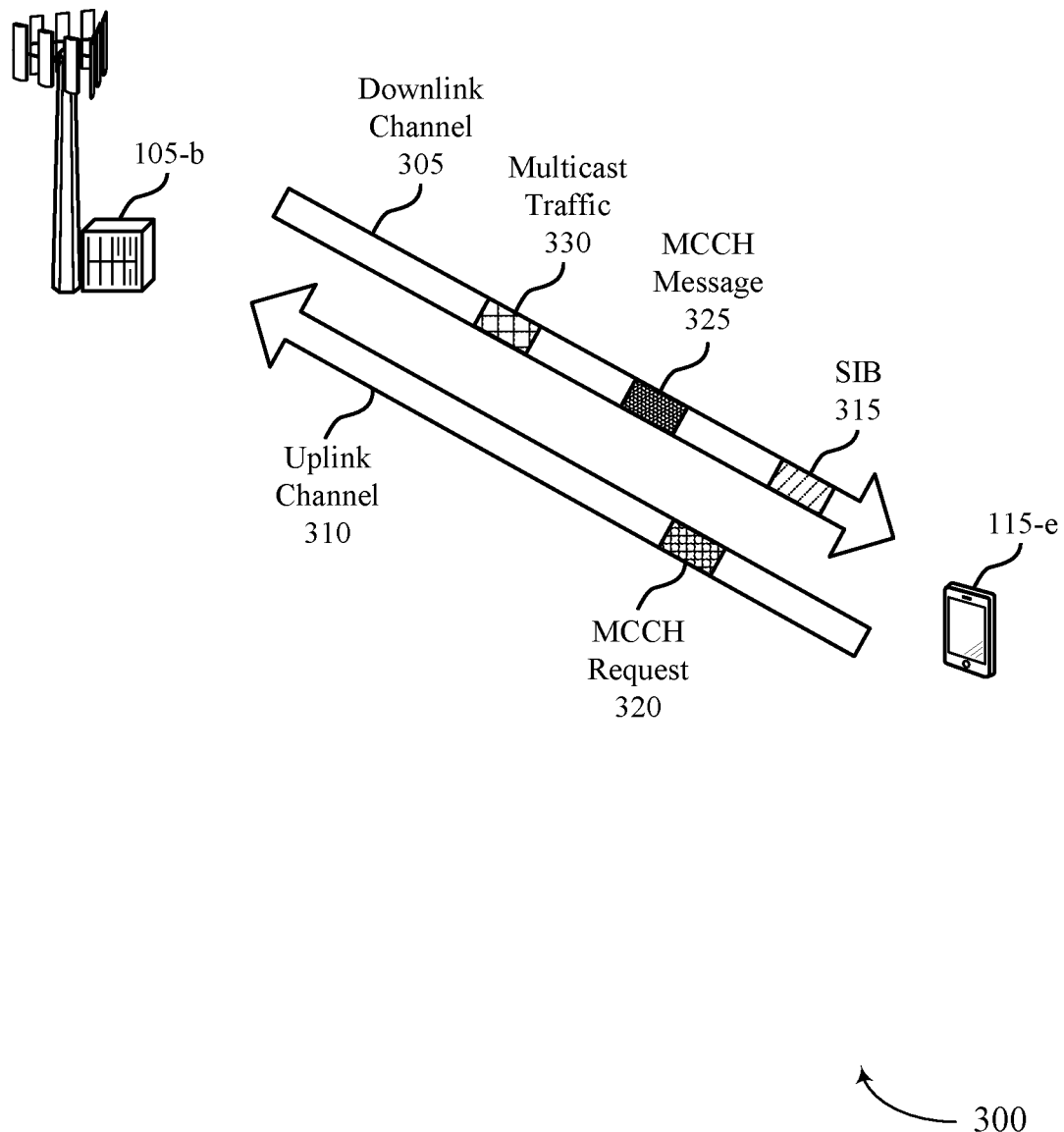
FIG. 3 illustrates an example of a wireless communications system that supports on-demand MCCH messages in accordance with aspects of the present disclosure.

FIG. 3 illustrates an example wireless communications system 300 that supports on-demand MCCH messages in accordance with aspects of the present disclosure. In some examples, the wireless communications system 300 may implement aspects of the wireless communications systems as described with reference to FIGS. 1 and 2. For example, the base station 105-*b* and UE 115-*e* may be examples of the base stations 105 and UEs 115 as described with reference to FIGS. 1 and 2.

The UE 115-*e* may be in communication with the base station 105-*b* by the downlink channel 305 and the uplink channel 310. The base station 105-*b* may transmit multicast traffic 330 to one or more multicast service groups (e.g., including one or more UEs 115 as described with reference to FIG. 2). The base station 105-*b* may transmit the multicast traffic 330 to the one or more UEs 115 by an MRB. Thus, the UE 115-*e* may receive multicast traffic 330 from the base station 105-*b* in accordance with an MRB configuration. The base station 105-*b* may indicate the MRB configuration to the UE 115-*e* by the messages illustrated within the wireless communications system 300 that are exchanged on the downlink channel 305 and the uplink channel 310.

The base station 105-*b* may transmit system information to the UE 115-*e* within a system information block (SIB) 315. The base station 105-*b* may broadcast the SIB 315 periodically or, alternatively, transmit the SIB 315 on-demand. The UE 115-*e* may determine whether the SIB 315 is broadcast or transmitted on-demand based on prior system information transmissions from the base station 105-*b*. That is, the base station 105-*b* may transmit a master information block (e.g., by a single side band transmission) and a system information block (e.g., by a remaining minimum system information transmission) indicating information related to the periodicity of the SIB 315, the configuration for a request for the SIB 315, or both. For the on-demand SIB 315, the UE 115-*e* may transmit a request for the SIB 315 by a random access preamble message (e.g., message one of a random access procedure), an RRC system information request (e.g., message three of a random access procedure), an RRC MCCH request, or within a payload of a first random access message of a two-step random access procedure (e.g., message 'A' of a random access procedure). Here, the UE 115-*e* may receive the SIB 315 in response to transmitting the request for the SIB 315.

The SIB 315 may indicate an MCCH message configuration to the UE 115-*e*. The UE 115-*e* may monitor the downlink channel 305 for the SIB 315 to begin MCCH acquisition. The UE 115-*e* may acquire MCCH due to cell selection or reselection (e.g., selecting a serving base station 105). For example, prior to cell selection, the UE 115-*e* may determine that the base station 105-*b* transmits multicast traffic 330 associated with the UE 115-*e* by acquiring the MCCH of the base station 105-*b* (e.g., receiving and decoding the MCCH message 325). Additionally or alternatively, the UE 115-*e* may select the base station 105-*b* and begin MCCH acquisition based on the cell selection of base station 105-*b*. In another example, the UE 115-*e* may acquire MCCH due to a handover into a new cell. That is, the UE 115-*e* may be handed over to the base station 105-*b* and the UE 115-*e* may begin MCCH acquisition based on the handover. In another example, the UE 115-*e* may begin MCCH acquisition based on receiving an MCCH configuration change indication (e.g., by downlink control information (DCI) format 1C) or in response to a new service start (e.g., the UE 115-*e* is to start receiving the multicast traffic 330).

The MCCH configuration may indicate a periodicity of the MCCH message 325 broadcast (e.g., an MCCH repetition period). The MCCH configuration may further indicate a radio network temporary identifier (RNTI) for the multicast traffic 330. Additionally, the MCCH configuration may indicate slots (e.g., within a PDCCH) associated with the MCCH message 325. That is, the MCCH configuration may indicate an initial slot of the MCCH message 325 and a duration of the MCCH message 325. The MCCH configuration may indicate a search space associated with the MCCH message 325 and a time window for monitoring a channel (e.g., a PDCCH) for the MCCH message 325. The MCCH configuration may also indicate an MCCH modification period associated with a duration of the MCCH message configuration. That is, the MCCH message 325 may be reconfigured according to the MCCH modification period. In some cases, a change to the MCCH message configuration may be indicated by a DCI format 1C (e.g., addressed by the RNTI). Thus, the UE 115-*e* may determine to receive an additional SIB 315 indicating the updated MCCH message configuration after the MCCH modification period if the DCI format 1C indicates the MCCH message configuration change.

The MCCH message configuration may indicate a delivery method of the MCCH message 325. That is, the MCCH message 325 may be delivered to the multicast service group (e.g., the multicast/broadcast service group) including the UE 115-*e* and the MCCH message configuration may indicate whether the MCCH message 325 broadcast to the multicast service group or transmitted on-demand to the UEs 115 within the multicast service group. In some cases, the base station 105-*b* may transmit the MCCH message 325 on-demand and by a periodic broadcast. Additionally or alternatively, the base station 105-*b* may exclusively transmit the MCCH message 325 on-demand. In either case, the MCCH message configuration may optionally indicate a MCCH request configuration for the multicast service group. The MCCH request configuration may indicate a random access occasion for the MCCH request 320. The MCCH request configuration may also indicate one or more of a request period for the MCCH request 320, the resources for the MCCH request 320 (e.g., ra-preamble, ra-ssb-OccasionMaskIndex, ra-AssociationPeriodIndex), an MCCH request 320 monitoring time window, and an MCCH request 320 monitoring period.

In some cases the UE 115-*e* may transmit an MCCH request 320 to the base station 105-*b* by the uplink channel 310 after receiving the SIB 315. That is, the UE 115-*e* may receive the SIB 315 and determine, based on the MCCH configuration indicated by the SIB 315, that the base station 105-*b* supports on-demand MCCH message transmission. In a case that the MCCH configuration indicates a configuration for the MCCH request 320, the UE 115-*e* may transmit the MCCH request 320 by a random access message (e.g., within the random access occasion indicated by the configuration for the MCCH request 320). For example, the UE 115-*e* may transmit the MCCH request 320 by a random access preamble to the base station 105-*a* (e.g., message one of the random access procedure) or a first random access message of a two-step random access procedure (e.g., message 'A' of the random access procedure). The UE 115-*e* may then monitor the downlink channel 305 for a RAR message from the base station 105-*b*. After receiving the RAR message, the UE 115-*e* may monitor the downlink channel 305 (e.g., a PDCCH channel) to receive the MCCH message 325. In another example, the MCCH message configuration may not include a configuration for the MCCH request 320. Here, the UE 115-*e* may determine to transmit the MCCH request 320 by an RRC message (e.g., an RRCMCCHRequest message). The UE 115-*e* may transmit the RRC message (e.g., including the MCCH request 320) in an RRC system information request (e.g., message three of a random access procedure), in an RRC MCCH request, or within a payload of a first random access message of a two-step random access procedure (e.g., message 'A' of the random access procedure). Alternatively (e.g., if the UE 115-*e* is in a connected RRC state such as RRC_CONNECTED), the UE 115-*e* may transmit the MCCH request 320 by an RRC message. After transmitting the MCCH request 320 by an RRC message, the UE 115-*e* may monitor the downlink channel 305 (e.g., a PDCCH, RRC) for the MCCH message 325.

The UE 115-*e* may monitor resources (e.g., indicated by the MCCH message configuration) for the MCCH message 325. For example, the UE 115-*e* may monitor the control resource set and search space indicated by the MCCH message configuration to detect the MCCH message 325. That is, the UE 115-*e* may monitor within the MCCH monitoring time window, within the MCCH monitoring period, and according to the MCCH monitoring offset indicated by the MCCH message configuration. In some cases, the UE 115-*e* may monitor resources within the PDCCH to detect the MCCH message 325. For example, the UE 115-*e* may monitor a single frequency network (e.g., determined based on the MCCH monitoring period and MCCH monitoring offset indicated by the MCCH message configuration) during the slots indicated by the MCCH message configuration and by the beams within the MCCH. Additionally or alternatively, the UE 115-*e* may determine that the MCCH message 325 is to be received by RRC signaling.

The base station 105-*b* may transmit the MCCH message 325 to the UE 115-*e* according to the MCCH message configuration indicated within the SIB 315. That is, the base station 105-*b* may transmit the MCCH message 325 within the MCCH monitoring time window, within the MCCH monitoring period, and according to the MCCH monitoring offset indicated by the MCCH message configuration. The base station 105-*b* may transmit the MCCH message 325 by the PDCCH or by an RRC message. In some cases, the base station 105-*b* may transmit multiple MCCH messages 325, where each MCCH message 325 serves a subset of MRBs (e.g., indicates a configuration for a portion of the MRBs associated with the base station 105-*a*). For example, the base station 105-*b* may transmit a first MCCH message 325 indicating a configuration for MRBs that are associated delay-sensitive. Additionally, the base station 105-*b* may transmit a second MCCH message 325 indicating a configuration for MRBs that are not delay-sensitive (e.g., associated with normal latency requirements).

The base station 105-*b* may transmit the MCCH message 325 in response to the MCCH request 320. Here, the MCCH message 325 may be a subset of the MCCH message 325 that the base station 105-*b* transmits periodically (e.g., broadcasts to more than one UE 115). That is, the MCCH message 325 may include information related specifically to the UE 115-*e* and the multicast traffic 330 requested by the UE 115-*e* (e.g., by the MCCH request 320). Additionally or alternatively, both the periodic and on-demand MCCH message may be included within the MCCH message 325. In either case, the MCCH message 325 may indicate an MRB configuration to the UE 115-*e*. The UE 115-*e* may receive the multicast traffic 330 from the base station 105-*b* in accordance with the MRB configuration indicated by the MCCH message 325.

Figure 4:
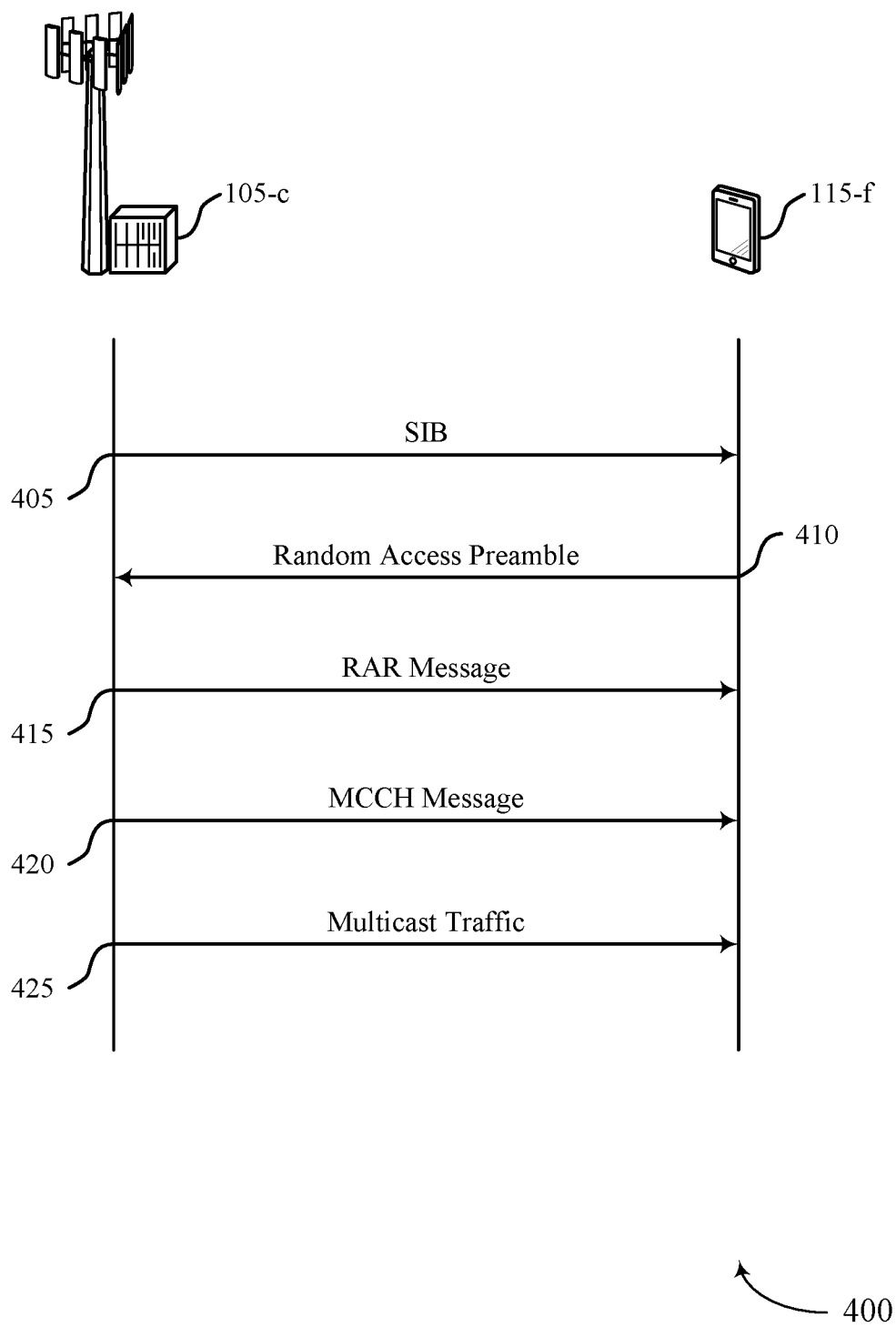
FIG. 4 illustrates an example of a process flow that supports on-demand MCCH messages in accordance with aspects of the present disclosure.

FIG. 4 illustrates an example process flow 400 that supports on-demand MCCH messages in accordance with aspects of the present disclosure. In some examples, the process flow 400 may implement aspects of the wireless communications systems as described with reference to FIGS. 1 through 3. For example, the base station 105-*c* and UE 115-*f* may be examples of the base stations 105 and UEs 115 as described with reference to FIGS. 1 through 3. The process flow 400 may illustrate an example of the UE 115-*f* transmitting a request for an MCCH message to the base station 105-*c* in a case where the MCCH message configuration indicates an MCCH request configuration.

At 405, the base station 105-*c* may transmit system information (e.g., by a SIB) to the UE 115-*f*. The SIB may indicate an MCCH message configuration to the UE 115-*f*. The MCCH message configuration may indicate a configuration for receiving an MCCH message in addition to an MCCH request configuration. The MCCH request configuration may include at least one of an indication of a time period for transmitting the request or resources for transmitting the request. The MCCH message configuration may also include at least one of an indication of a search space associated with the MCCH message or a time period for receiving the MCCH message.

At 410, the UE 115-*f* may transmit a random access preamble including a request for the MCCH message the base station 105-*c*. The UE 115-*f* may determine to transmit the request by the random access preamble based on the SIB including the MCCH message request configuration. Additionally, the UE 115-*f* may transmit the request according to the MCCH message request configuration.

At 415, the UE 115-*f* may receive a RAR message from the base station. The UE 115-*f* may begin monitoring a PDCCH for the MCCH message based on receiving the RAR message from the base station 105-*c*. That is, the UE 115-*f* may monitor the PDCCH for the MCCH message in accordance with the MCCH message configuration. For example, the UE 115-*f* may monitor a control resource set (e.g., associated with one or more of a monitoring time window, a monitoring period, a monitoring offset) of the PDCCH indicated by the SIB.

At 420, the base station 105-*c* may transmit the MCCH message to the UE 115-*f* according to the MCCH message configuration. The UE 115-*f* may receive the MCCH message based on monitoring the PDCCH. The MCCH message may indicate a MRB configuration (e.g., a multicast/broadcast radio bearer configuration) for multicast traffic (e.g., the multicast/broadcast traffic) transmitted by the base station 105-c.

At 425, the base station 105-c may transmit the multicast traffic (e.g., the multicast/broadcast traffic) to the UE 115-f in accordance with the MRB configuration.

Figure 5:
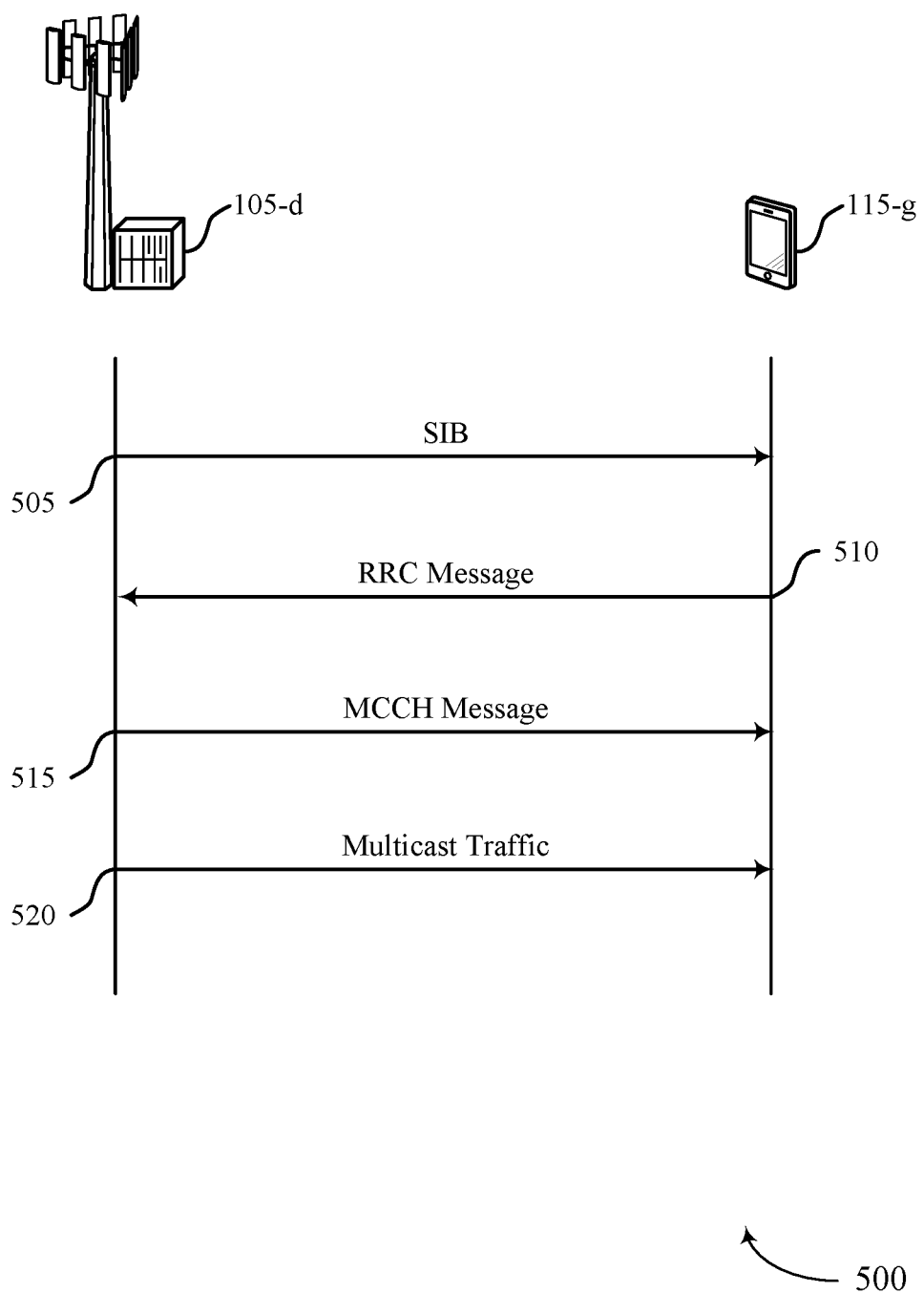
FIG. 5 illustrates an example of a process flow that supports on-demand MCCH messages in accordance with aspects of the present disclosure.

FIG. 5 illustrates an example process flow 500 that supports on-demand MCCH messages in accordance with aspects of the present disclosure. In some examples, the process flow 500 may implement aspects of the wireless communications systems as described with reference to FIGS. 1 through 3. For example, the base station 105-d and UE 115-g may be examples of the base stations 105 and UEs 115 as described with reference to FIGS. 1 through 3. The process flow 500 may illustrate an example of the UE 115-g transmitting a request for an MCCH message to the base station 105-d in a case where the MCCH message configuration fails to indicate an MCCH request configuration.

At 505, the base station 105-d may transmit system information (e.g., by a SIB) to the UE 115-g. The SIB may indicate an MCCH message configuration to the UE 115-g. The MCCH message configuration may also include at least one of an indication of a search space associated with the MCCH message or a time period for receiving the MCCH message. Here, the SIB may fail to indicate an MCCH message request configuration.

At 510, the UE 115-g may transmit an RRC message including a request for the MCCH message the base station 105-d. The UE 115-g may determine to transmit the request by the random access preamble based on an absence of an MCCH message request configuration within the SIB. The UE 115-g may transmit the RRC message within an RRC system information request, an RRC MCCH request, or a payload of a first random access message of a two-step random access procedure. After transmitting the RRC message, the UE 115-g may begin monitoring a PDCCH for the MCCH message. That is, the UE 115-g may monitor the PDCCH for the MCCH message in accordance with the MCCH message configuration. For example, the UE 115-g may monitor a control resource set (e.g., associated with one or more of a monitoring time window, a monitoring period, a monitoring offset) of the PDCCH indicated by the SIB. In some other cases, the UE 115-g may determine that the MCCH message is to be received by an RRC message (e.g., based on the MCCH message configuration).

At 515, the base station 105-d may transmit the MCCH message to the UE 115-g according to the MCCH message configuration (e.g., by a PDCCH transmission, by RRC signaling). In some cases, the UE 115-g may receive the MCCH message based on monitoring the PDCCH. Additionally or alternatively, the UE 115-g may receive the MCCH message by RRC signaling from the base station 105-d. The MCCH message may indicate a MRB configuration (e.g., a multicast/broadcast radio bearer configuration) for multicast traffic (e.g., the multicast/broadcast traffic) transmitted by the base station 105-d.

At 520, the base station 105-d may transmit the multicast traffic (e.g., the multicast/broadcast traffic) to the UE 115-g in accordance with the MRB configuration.

Figure 6:
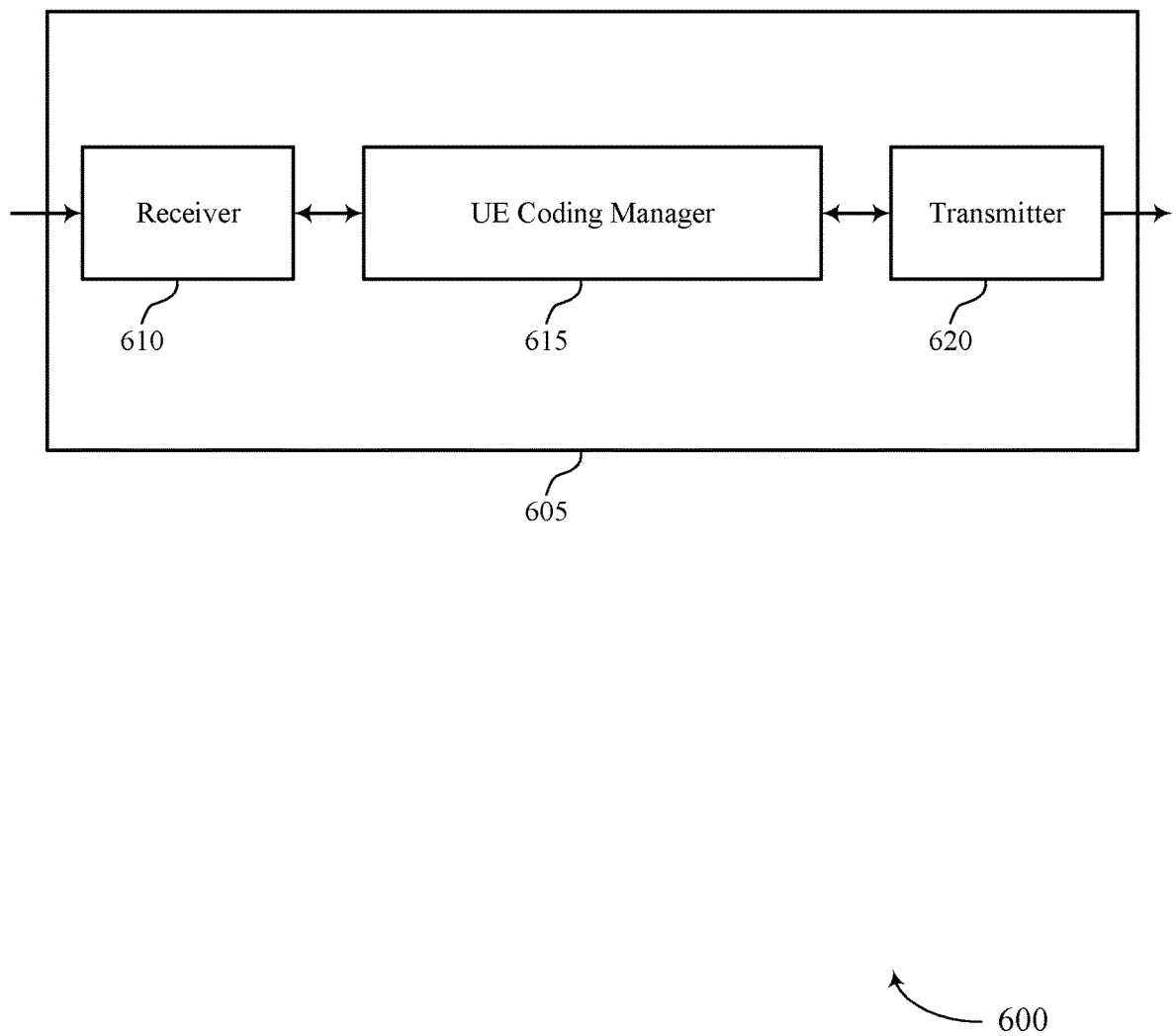
FIGS. 6 and 7 show block diagrams of devices that support on-demand MCCH messages in accordance with aspects of the present disclosure.

FIG. 6 shows a block diagram 600 of a device 605 that supports on-demand MCCH messages in accordance with aspects of the present disclosure. The device 605 may be an example of aspects of a UE 115 as described herein. The device 605 may include a receiver 610, a UE coding manager 615, and a transmitter 620. The device 605 may also include a processor. The UE Coding Manager 615 can be implemented, at least in part, by one or both of a modem and a processor. Each of these components may be in communication with one another (e.g., via one or more buses).

The receiver 610 may receive information such as packets, user data, or control information associated with various information channels (e.g., control channels, data channels, and information related to on-demand MCCH messages, etc.). Information may be passed on to other components of the device 605. The receiver 610 may be an example of aspects of the transceiver 920 described with reference to FIG. 9. The receiver 610 may utilize a single antenna or a set of antennas.

The UE Coding Manager 615 may receive, from a base station, system information indicating a MCCH message configuration, transmit, to the base station, a request for a MCCH message, receive, in accordance with the MCCH message configuration and in response to transmission of the request, the MCCH message which is indicative of a MRB configuration, and receive multicast traffic from the base station in accordance with the MRB configuration. The UE Coding Manager 615 may be an example of aspects of the UE Coding Manager 910 described herein.

The UE Coding Manager 615, or its sub-components, may be implemented in hardware, code (e.g., software or firmware) executed by a processor, or any combination thereof. If implemented in code executed by a processor, the functions of the UE Coding Manager 615, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The UE Coding Manager 615 may be implemented as an integrated circuit or chipset for the device 605 modem, and the receiver 610 and the transmitter 620 may be implemented as analog components (for example, amplifiers, filters, antennas) coupled with the device 605 modem to enable wireless transmission and reception. The UE Coding Manager 615 may be implemented to realize one or more potential improvements. At least one implementation may enable the UE Coding Manager 615 to receive MCCH messages on-demand. Based on implementing the receiving, one or more processors of the device 605 (for example, processor(s) controlling or incorporated with the UE Coding Manager 615) may promote low latency communications, among other benefits.

The UE Coding Manager 615, or its sub-components, may be physically located at various positions, including being distributed such that portions of functions are implemented at different physical locations by one or more physical components. In some examples, the UE Coding Manager 615, or its sub-components, may be a separate and distinct component in accordance with various aspects of the present disclosure. In some examples, the UE Coding Manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
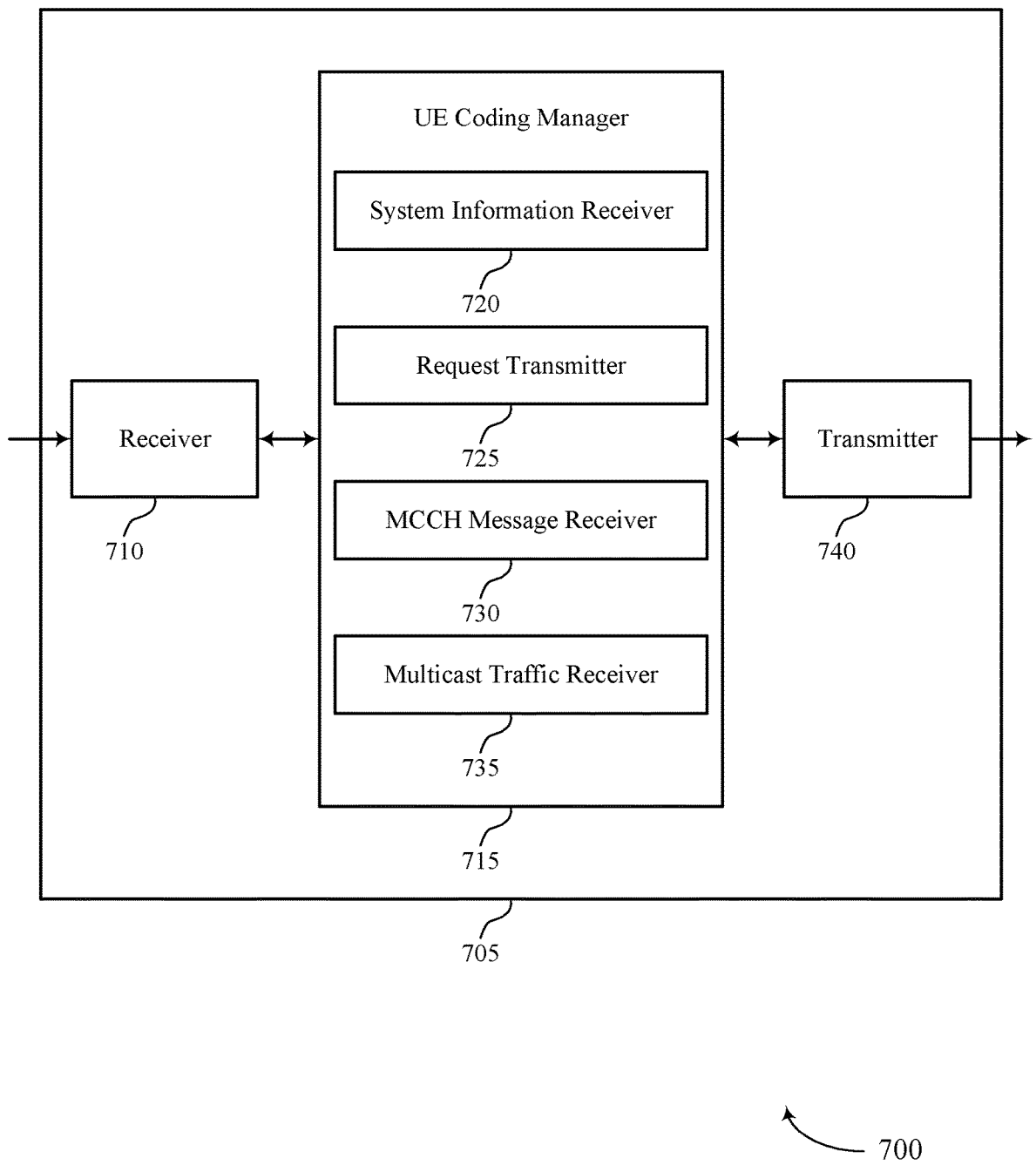

FIG. 7 shows a block diagram 700 of a device 705 that supports on-demand MCCH messages in accordance with aspects of the present disclosure. The device 705 may be an example of aspects of a device 605, or a UE 115 as described herein. The device 705 may include a receiver 710, a UE coding manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to on-demand MCCH messages, etc.). Information may be passed on to other components of the device 705. The receiver 710 may be an example of aspects of the transceiver 920 described with reference to FIG. 9. The receiver 710 may utilize a single antenna or a set of antennas.

The UE Coding Manager 715 may be an example of aspects of the UE Coding Manager 615 as described herein. The UE Coding Manager 715 may include a system information receiver 720, a request transmitter 725, a MCCH message receiver 730, and a multicast traffic receiver 735. The UE Coding Manager 715 may be an example of aspects of the UE Coding Manager 910 described herein.

The system information receiver 720 may receive, from a base station, system information indicating a MCCH message configuration.

The request transmitter 725 may transmit, to the base station, a request for a MCCH message.

The MCCH message receiver 730 may receive, in accordance with the MCCH message configuration and in response to transmission of the request, the MCCH message which is indicative of a MRB configuration.

The multicast traffic receiver 735 may receive multicast traffic from the base station in accordance with the MRB configuration.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
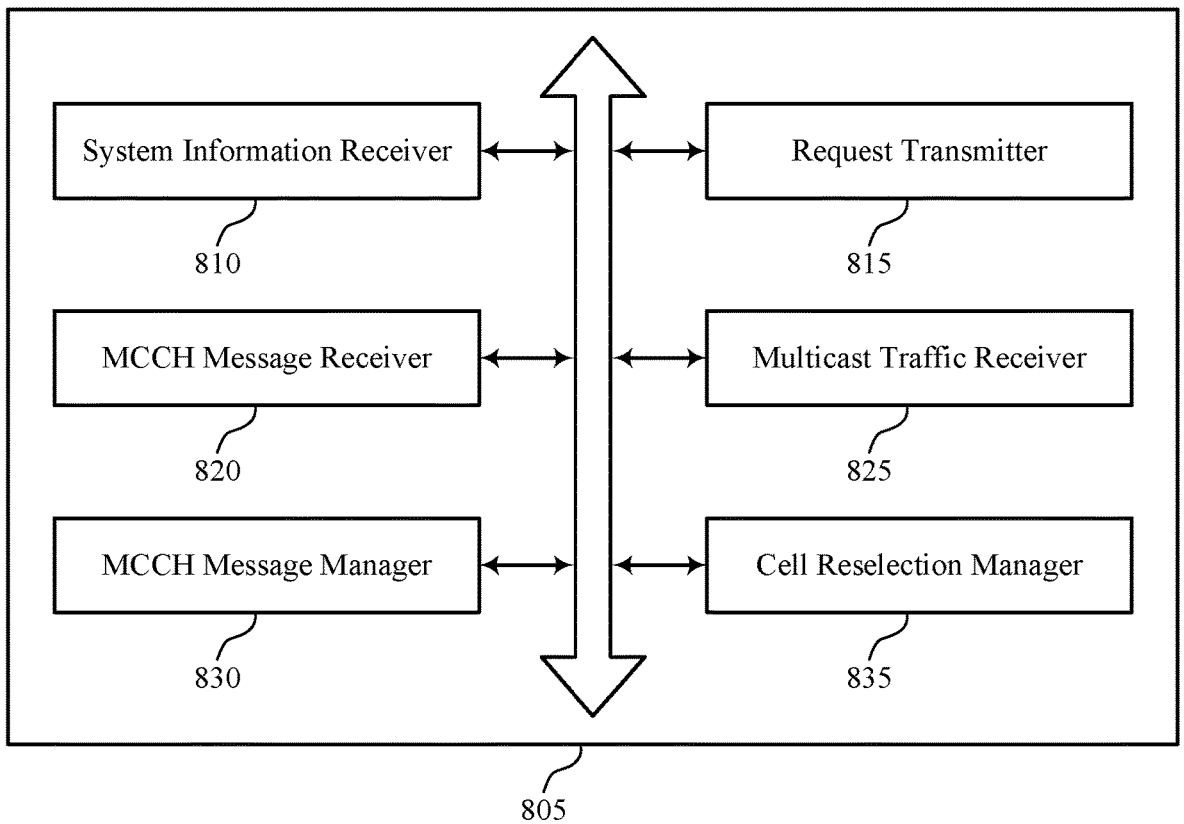
FIG. 8 shows a block diagram of a UE coding manager that supports on-demand MCCH messages in accordance with aspects of the present disclosure.

FIG. 8 shows a block diagram 800 of a UE Coding Manager 805 that supports on-demand MCCH messages in accordance with aspects of the present disclosure. The UE Coding Manager 805 may be an example of aspects of a UE Coding Manager 615, a UE Coding Manager 715, or a UE Coding Manager 910 described herein. The UE Coding Manager 805 may include a system information receiver 810, a request transmitter 815, a MCCH message receiver 820, a multicast traffic receiver 825, a MCCH message manager 830, and a cell reselection manager 835. Each of these modules may communicate, directly or indirectly, with one another (e.g., via one or more buses).

The system information receiver 810 may receive, from a base station, system information indicating a MCCH message configuration. In some cases, the system information indicates a MCCH message request configuration. In some cases, the MCCH message request configuration includes at least one of an indication of a time period for transmitting the request or resources for transmitting the request. In some instances the MCCH message configuration includes at least one of an indication of a search space associated with the MCCH message or a time period for receiving the MCCH message. In some examples, the MCCH message configuration includes an indication of a repetition period of the MCCH message, an identifier associated with the multicast traffic, one or more slots associated with the MCCH message, a modification period associated with the MCCH message, a new service start, or a combination thereof.

In some examples, the system information receiver 810 may receive the system information is based on the UE performing a cell reselection procedure, the UE performing a cell selection procedure, the UE performing a handover procedure, a change associated with the MCCH message, or a combination thereof. In some cases, the system information includes an indication of the area identifier.

The request transmitter 815 may transmit, to the base station, a request for a MCCH message. In some examples, the request transmitter 815 may transmit the request for the MCCH message is based on the system information indicating that the MCCH message is to be received on-demand.

In some examples, the request transmitter 815 may transmit the request by a random access preamble to the base station within a random access occasion indicated by a MCCH message request configuration within the system information. In some cases, the request transmitter 815 may determine to transmit the request by the random access preamble based on the system information including the MCCH message request configuration.

In some examples, the request transmitter 815 may transmit the request by a RRC request message. In some cases, the request transmitter 815 may determine to transmit the request by the RRC request message based on an absence of an MCCH message request configuration within the SIB. In some instances, transmitting the request further includes transmitting the request in accordance with the MCCH message request configuration. In some cases, the RRC request message is included within an RRC system information request, an RRC MCCH request, or a payload of a first random access message of a two-step random access procedure.

The MCCH message receiver 820 may receive, in accordance with the MCCH message configuration and in response to transmission of the request, the MCCH message which is indicative of a MRB configuration. In some cases, the MRB configuration is a multicast/broadcast service radio bearer configuration. In some cases, the MCCH message includes both an on-demand MCCH message and a periodic MCCH message. In some examples, the MCCH message is associated with a set of delay sensitive MRB configurations including the MRB configuration. In some other examples, the MCCH message is associated with a set of MRB configurations that are delay insensitive. In some instances, the set of MRB configurations includes the MRB configuration. In some examples, the MCCH message receiver 820 may receive the MCCH message by a RRC configuration message responsive to the RRC request message.

In some examples, the MCCH message receiver 820 may determine a service group associated with the multicast traffic, where receiving the MCCH message is based on the determined service group. In some examples, the MCCH message receiver 820 may determine a service group identifier associated with the service group based on a MRB context or a multicast broadcast service identifier.

The multicast traffic receiver 825 may receive multicast traffic from the base station in accordance with the MRB configuration. In some cases, the multicast traffic is multicast/broadcast traffic.

The MCCH message manager 830 may receive a RAR message from the base station, where receiving the MCCH message is based on receiving the RAR message. In some examples, the MCCH message manager 830 may monitor a physical downlink control channel for the MCCH message in accordance with the MCCH message configuration, where receiving the MCCH message is based on monitoring the physical downlink control channel. In some cases, the MCCH message manager 830 may monitor a control resource set of the physical downlink control channel indicated by the system information. In some cases, the control resource set is associated with a monitoring time window, a monitoring period, a monitoring offset, or a combination thereof.

The cell reselection manager 835 may perform a cell reselection procedure from a first base station to a second base station, where the base station is the first base station. In some examples, the cell reselection manager 835 may determine that the second base station transmits the multicast traffic in accordance with the MRB configuration based on a same area identifier being associated with a first MCCH message and a second MCCH message associated with the second base station, where the MCCH message is the first MCCH message. In some cases, the cell reselection manager 835 may determine to refrain from monitoring for system information from the second base station based on determining that the second base station transmits the multicast traffic in accordance with the MRB configuration.

In some examples, the cell reselection manager 835 may determine to perform a cell reselection procedure from a first base station, where the base station is a second base station. In some cases, the cell reselection manager 835 may receive an initial multicast control message from the first base station based on determining to perform the cell reselection procedure. In some instances, the cell reselection manager 835 may determine that the second base station transmits the multicast traffic based on the initial multicast control message. In some examples, the cell reselection manager 835 may perform the cell reselection procedure from the first base station to the second base station based on determining that the second base station transmits the multicast traffic, where receiving the system information is based on performing the cell reselection procedure.

Figure 9:
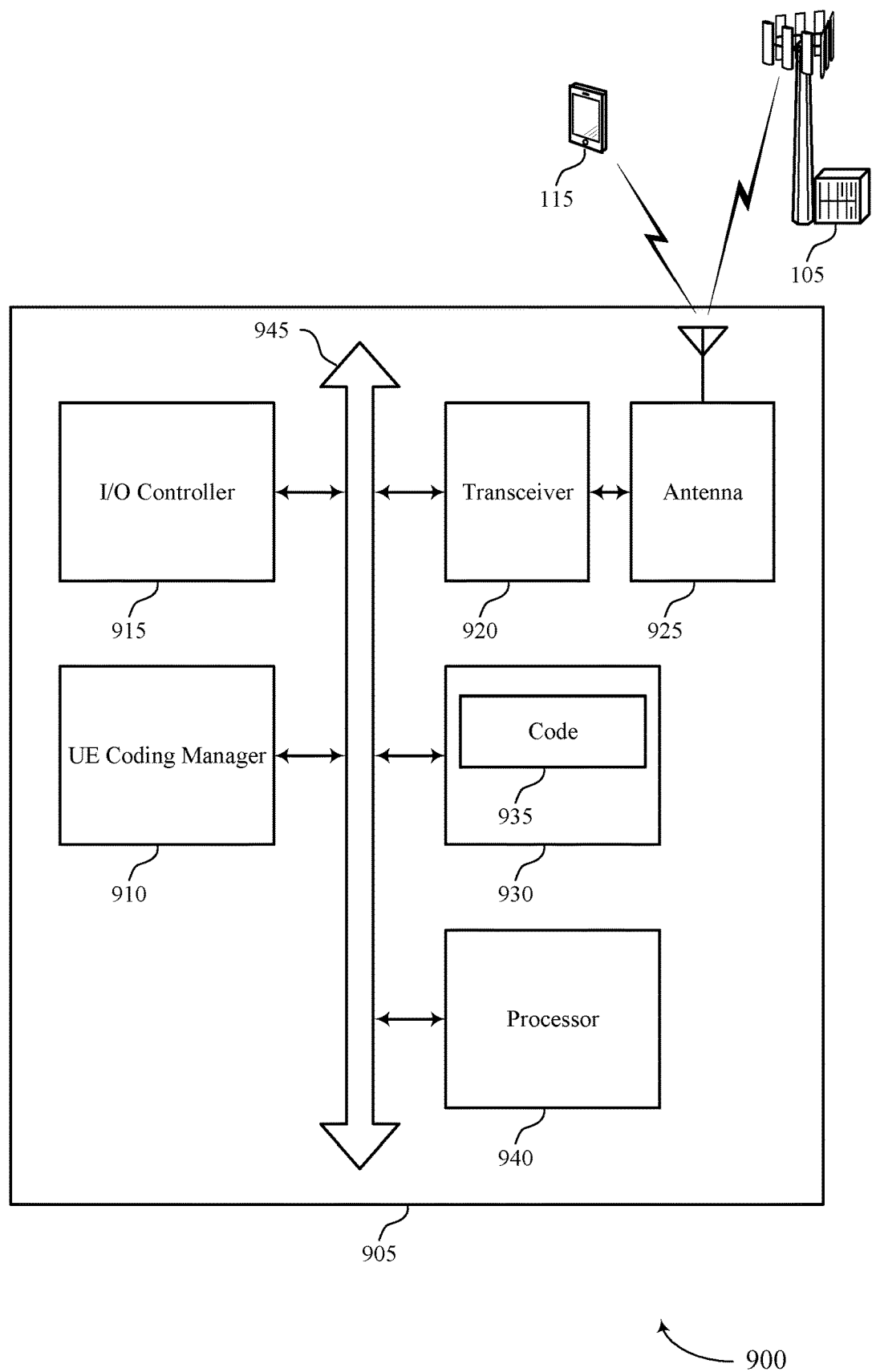
FIG. 9 shows a diagram of a system including a device that supports on-demand MCCH messages in accordance with aspects of the present disclosure.

FIG. 9 shows a diagram of a system 900 including a device 905 that supports on-demand MCCH messages in accordance with aspects of the present disclosure. The device 905 may be an example of or include the components of device 605, device 705, or a UE 115 as described herein. The device 905 may include components for bi-directional voice and data communications including components for transmitting and receiving communications, including a UE coding manager 910, an I/O controller 915, a transceiver 920, an antenna 925, memory 930, and a processor 940. These components may be in electronic communication via one or more buses (e.g., bus 945).

The UE Coding Manager 910 may receive, from a base station, system information indicating a MCCH message configuration, transmit, to the base station, a request for a MCCH message, receive, in accordance with the MCCH message configuration and in response to transmission of the request, the MCCH message which is indicative of a MRB configuration, and receive multicast traffic from the base station in accordance with the MRB configuration. At least one implementation may enable the UE Coding Manager 910 to receive MCCH messages on-demand. Based on implementing the receiving, one or more processors of the device 905 (for example, processor(s) controlling or incorporated with the UE Coding Manager 910) may experience reduced power consumption and promote low latency communications, among other benefits.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting on-demand MCCH messages).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
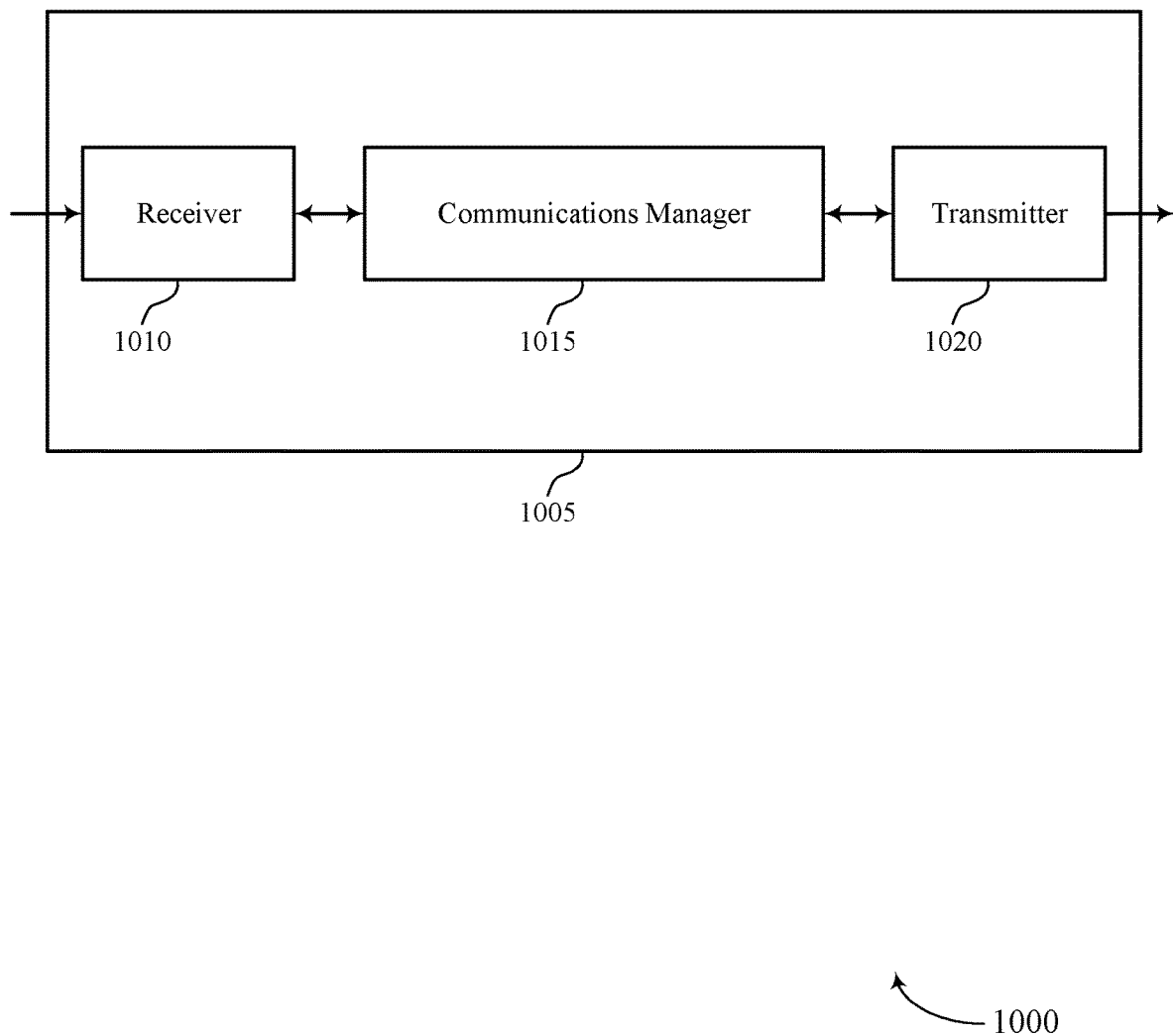
FIGS. 10 and 11 show block diagrams of devices that support on-demand MCCH messages in accordance with aspects of the present disclosure.

FIG. 10 shows a block diagram 1000 of a device 1005 that supports on-demand MCCH messages in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to on-demand MCCH messages, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit, to a UE, system information indicating a MCCH message configuration, receive, from the UE, a request for a MCCH message, transmit, in accordance with the MCCH message configuration and in response to receipt of the request, the MCCH message which is indicative of a MRB configuration, and transmit multicast traffic to the UE in accordance with the MRB configuration. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
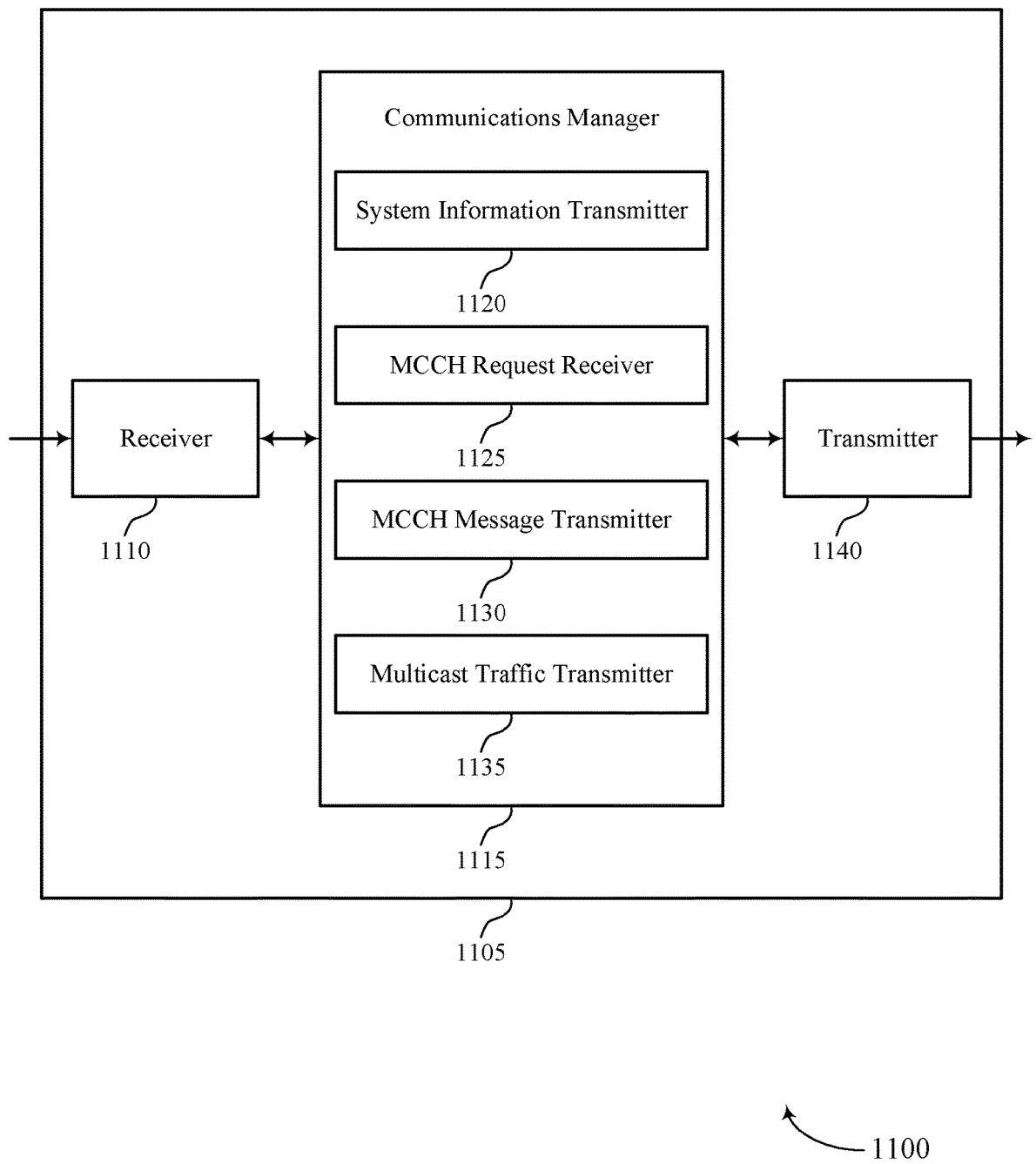

FIG. 11 shows a block diagram 1100 of a device 1105 that supports on-demand MCCH messages in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to on-demand MCCH messages, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a system information transmitter 1120, a MCCH request receiver 1125, a MCCH message transmitter 1130, and a multicast traffic transmitter 1135. The communications manager 1115 may be an example of aspects of the communications manager 1310 described herein.

The system information transmitter 1120 may transmit, to a UE, system information indicating a MCCH message configuration.

The MCCH request receiver 1125 may receive, from the UE, a request for a MCCH message.

The MCCH message transmitter 1130 may transmit, in accordance with the MCCH message configuration and in response to receipt of the request, the MCCH message which is indicative of a MRB configuration.

The multicast traffic transmitter 1135 may transmit multicast traffic to the UE in accordance with the MRB configuration.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
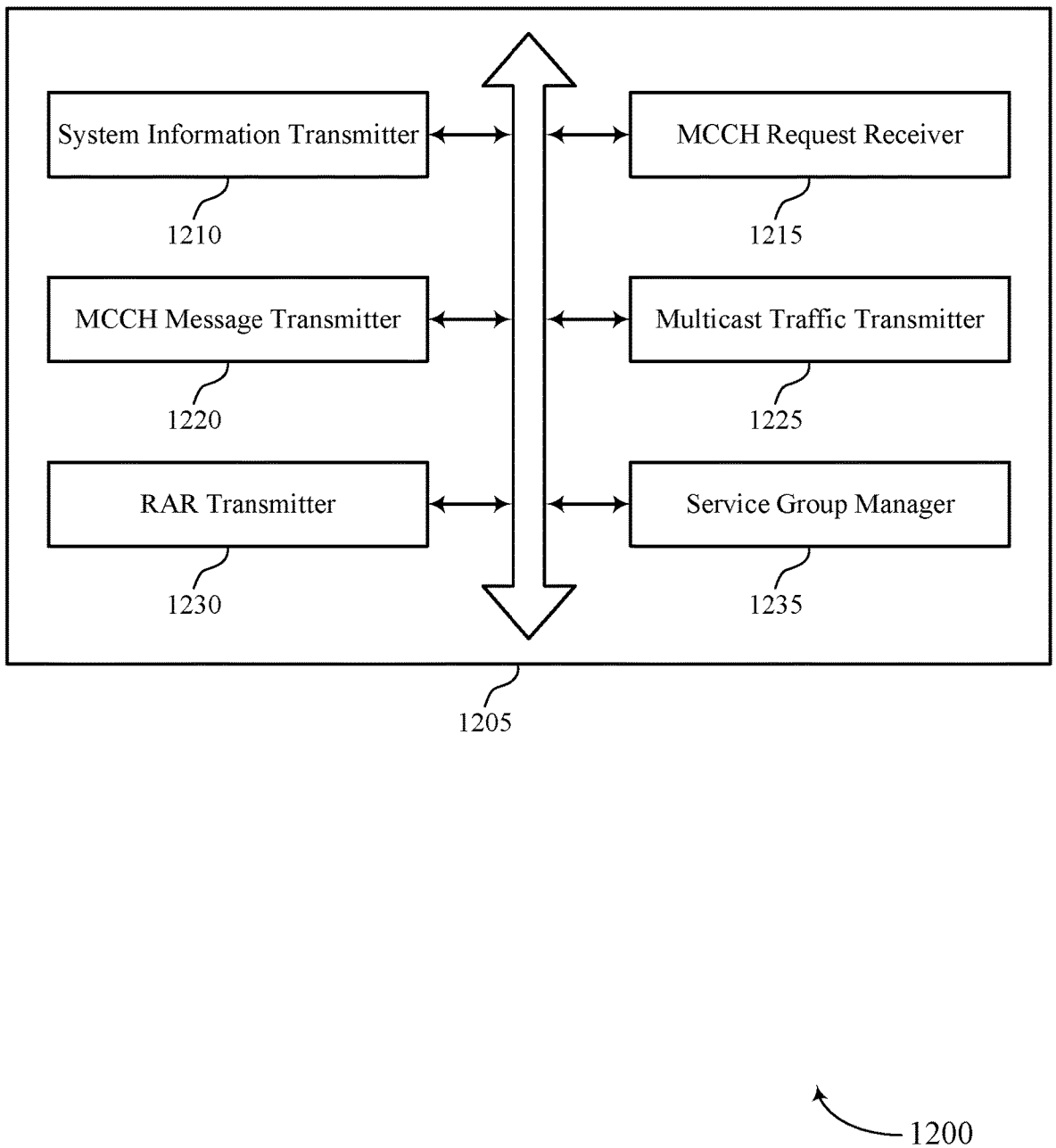
FIG. 12 shows a block diagram of a communications that supports on-demand MCCH messages in accordance with aspects of the present disclosure.

FIG. 12 shows a block diagram 1200 of a communications manager 1205 that supports on-demand MCCH messages in accordance with aspects of the present disclosure. The communications manager 1205 may be an example of aspects of a communications manager 1015, a communications manager 1115, or a communications manager 1310 described herein. The communications manager 1205 may include a system information transmitter 1210, a MCCH request receiver 1215, a MCCH message transmitter 1220, a multicast traffic transmitter 1225, a RAR transmitter 1230, and a service group manager 1235. Each of these modules may communicate, directly or indirectly, with one another (e.g., via one or more buses).

The system information transmitter 1210 may transmit, to a UE, system information indicating a MCCH message configuration. In some examples, the system information transmitter 1210 may transmit the system information is based on the UE performing a cell reselection procedure, the UE performing a cell selection procedure, the UE performing a handover procedure, a change associated with the MCCH message, or a combination thereof. In some cases, the system information indicates a MCCH message request configuration. In some instances, the MCCH message request configuration includes at least one of an indication of a time period for transmission by the UE of the request or resources for transmission by the UE of the request. In some examples, the MCCH message configuration includes at least one of an indication of a search space associated with the MCCH message or a time period for receiving the MCCH message. In some cases, the MCCH message configuration includes an indication of a repetition period of the MCCH message, an identifier associated with the multicast traffic, one or more slots associated with the MCCH message, a modification period associated with the MCCH message, a new service start, or a combination thereof.

The MCCH request receiver 1215 may receive, from the UE, a request for a MCCH message. In some examples, the MCCH request receiver 1215 may receive the request by a random access preamble from the UE within a random access occasion indicated by a MCCH message request configuration within the system information. In some cases, the MCCH request receiver 1215 may receive the request by a RRC request message. In some instances, receiving the request further includes receiving the request in accordance with the MCCH message request configuration. In some examples, the MCCH request receiver 1215 may receive the request for the MCCH message is based on the system information indicating that the MCCH message is to be transmitted on-demand. In some cases, the request is received by the random access preamble based on the system information including the MCCH message request configuration. In some instances, the RRC request message is included within a RRC system information request, within an RRC MCCH request, or within a payload of a first random access message of a two-step random access procedure. In some examples, the request is received by the RRC request message based on an absence of an MCCH message request configuration within the SIB.

The MCCH message transmitter 1220 may transmit, in accordance with the MCCH message configuration and in response to receipt of the request, the MCCH message which is indicative of a MRB configuration. In some examples, the MCCH message transmitter 1220 may transmit the MCCH message by a RRC configuration message responsive to the RRC request message. In some cases, the MCCH message transmitter 1220 may transmit the MCCH message by a physical downlink control channel in accordance with the MCCH message configuration. In some instances, the MCCH message transmitter 1220 may transmit the MCCH message within a control resource set indicated by the system information. In some cases, the control resource set is associated with a monitoring time window, a monitoring period, a monitoring offset, or a combination thereof.

In some examples, the MCCH message is a first MCCH message. In some cases, the first MCCH message is associated with a first set of MRB configurations including at least the MRB configuration. Here, the MCCH message transmitter 1220 may transmit a second MCCH message associated with a second set of MRB configurations, where one of the first set of MRB configurations or the second set of MRB configurations are delay sensitive. In some instances, the MCCH message includes both an on-demand MCCH message and a periodic MCCH message. In some cases, the MRB configuration is a multicast/broadcast service radio bearer configuration.

The multicast traffic transmitter 1225 may transmit multicast traffic to the UE in accordance with the MRB configuration. In some cases, the multicast traffic is multicast/broadcast traffic.

The RAR transmitter 1230 may transmit a RAR message to the UE, where transmitting the MCCH message is based on receiving the RAR message.

The service group manager 1235 may determine a service group associated with the multicast traffic, where transmitting the MCCH message is based on the determined service group. In some examples, the service group manager 1235 may determine a service group identifier associated with the service group based on a MRB context or a multicast broadcast service identifier.

Figure 13:
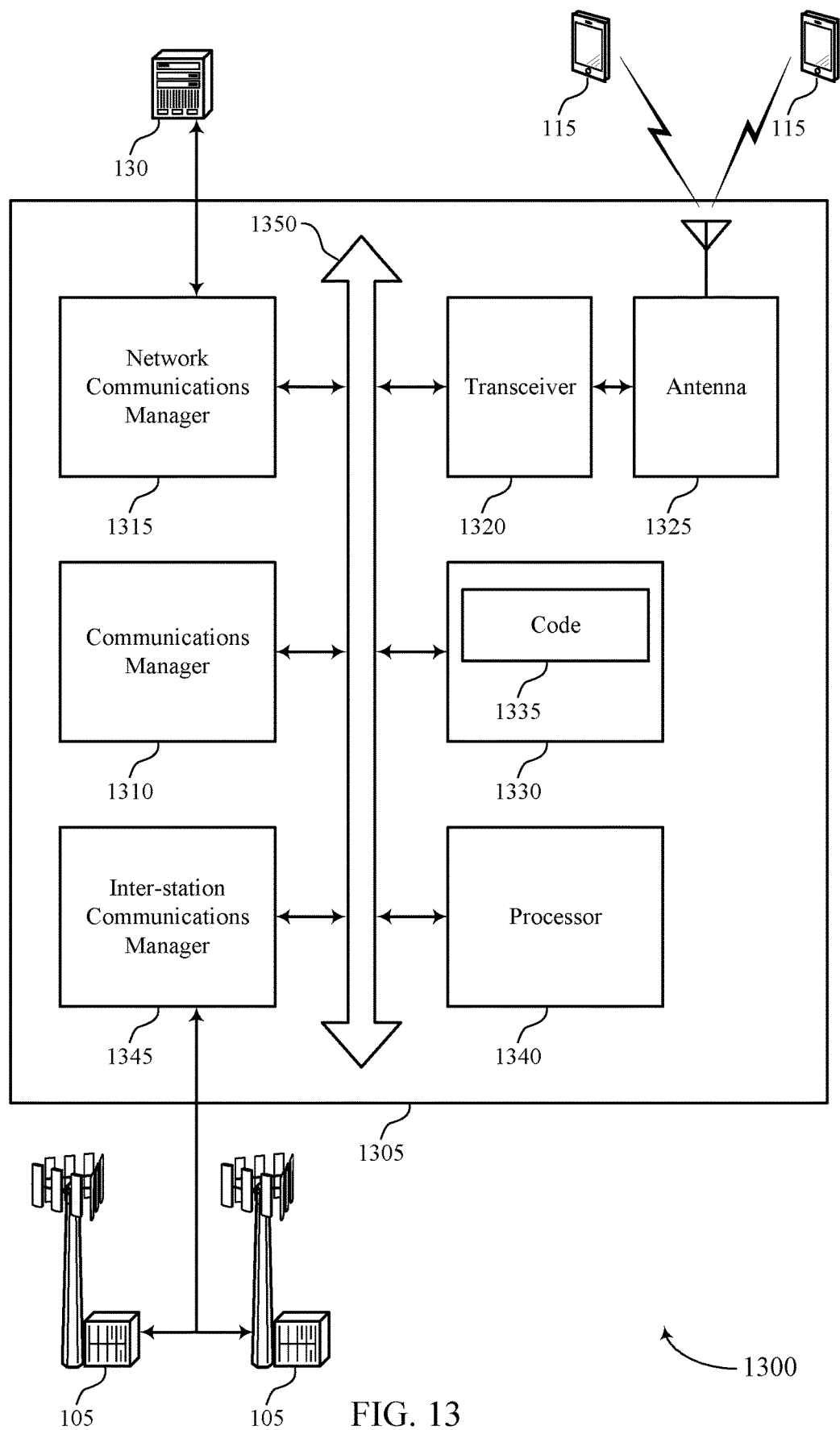
FIG. 13 shows a diagram of a system including a device that supports on-demand MCCH messages in accordance with aspects of the present disclosure.

FIG. 13 shows a diagram of a system 1300 including a device 1305 that supports on-demand MCCH messages in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit, to a UE, system information indicating a MCCH message configuration, receive, from the UE, a request for a MCCH message, transmit, in accordance with the MCCH message configuration and in response to receipt of the request, the MCCH message which is indicative of a MRB configuration, and transmit multicast traffic to the UE in accordance with the MRB configuration.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting on-demand MCCH messages).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
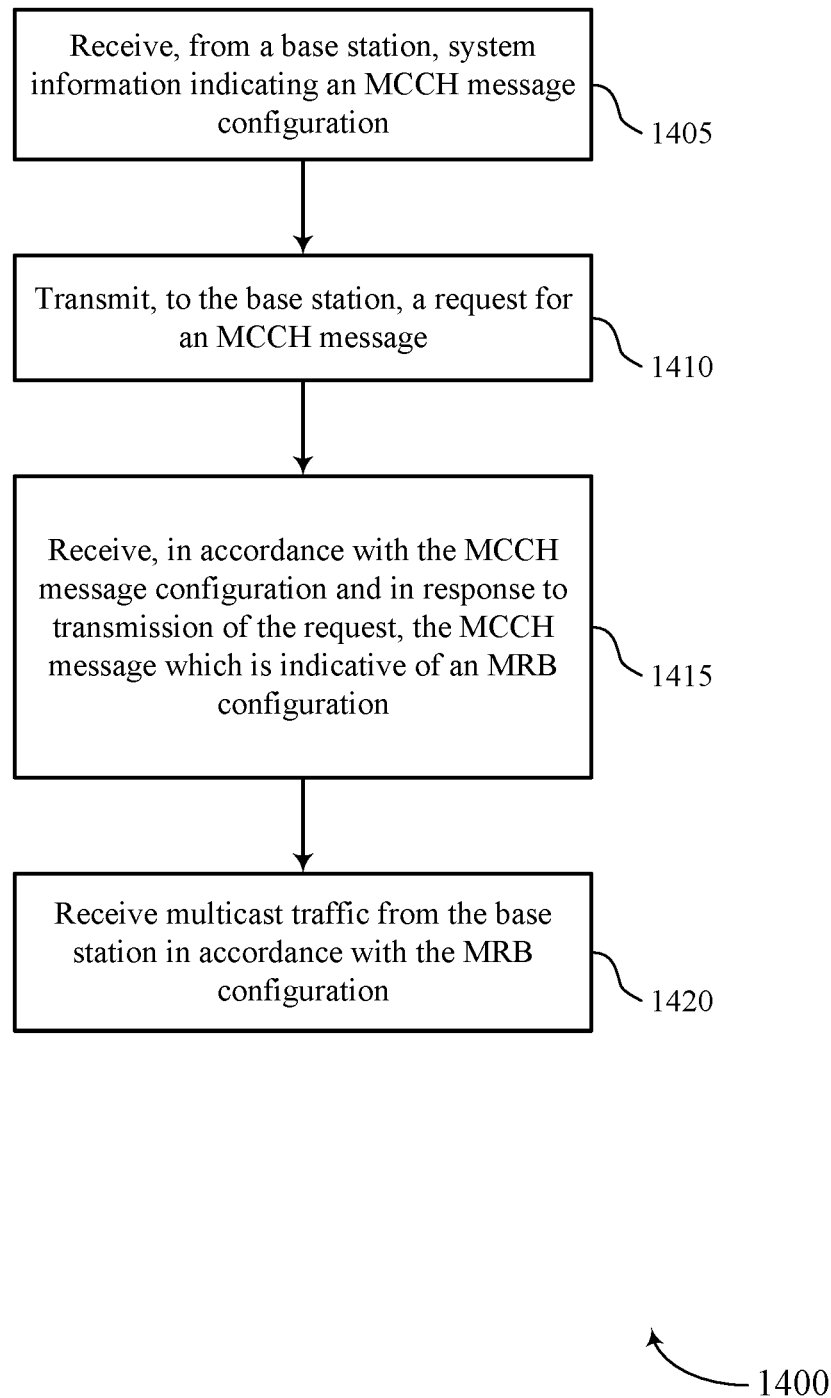
FIGS. 14 through 19 show flowcharts illustrating methods that support on-demand MCCH messages in accordance with aspects of the present disclosure.

FIG. 14 shows a flowchart illustrating a method 1400 that supports on-demand MCCH messages in accordance with aspects of the present disclosure. The operations of method 1400 may be implemented by a UE 115 or its components as described herein. For example, the operations of method 1400 may be performed by a UE Coding Manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may receive, from a base station, system information indicating a MCCH message configuration. The operations of 1405 may be performed according to the methods described herein. In some examples, aspects of the operations of 1405 may be performed by a system information receiver as described with reference to FIGS. 6 through 9.

At 1410, the UE may transmit, to the base station, a request for a MCCH message. The operations of 1410 may be performed according to the methods described herein. In some examples, aspects of the operations of 1410 may be performed by a request transmitter as described with reference to FIGS. 6 through 9.

At 1415, the UE may receive, in accordance with the MCCH message configuration and in response to transmission of the request, the MCCH message which is indicative of a MRB configuration. The operations of 1415 may be performed according to the methods described herein. In some examples, aspects of the operations of 1415 may be performed by a MCCH message receiver as described with reference to FIGS. 6 through 9.

At 1420, the UE may receive multicast traffic from the base station in accordance with the MRB configuration. The operations of 1420 may be performed according to the methods described herein. In some examples, aspects of the operations of 1420 may be performed by a multicast traffic receiver as described with reference to FIGS. 6 through 9.

Figure 15:
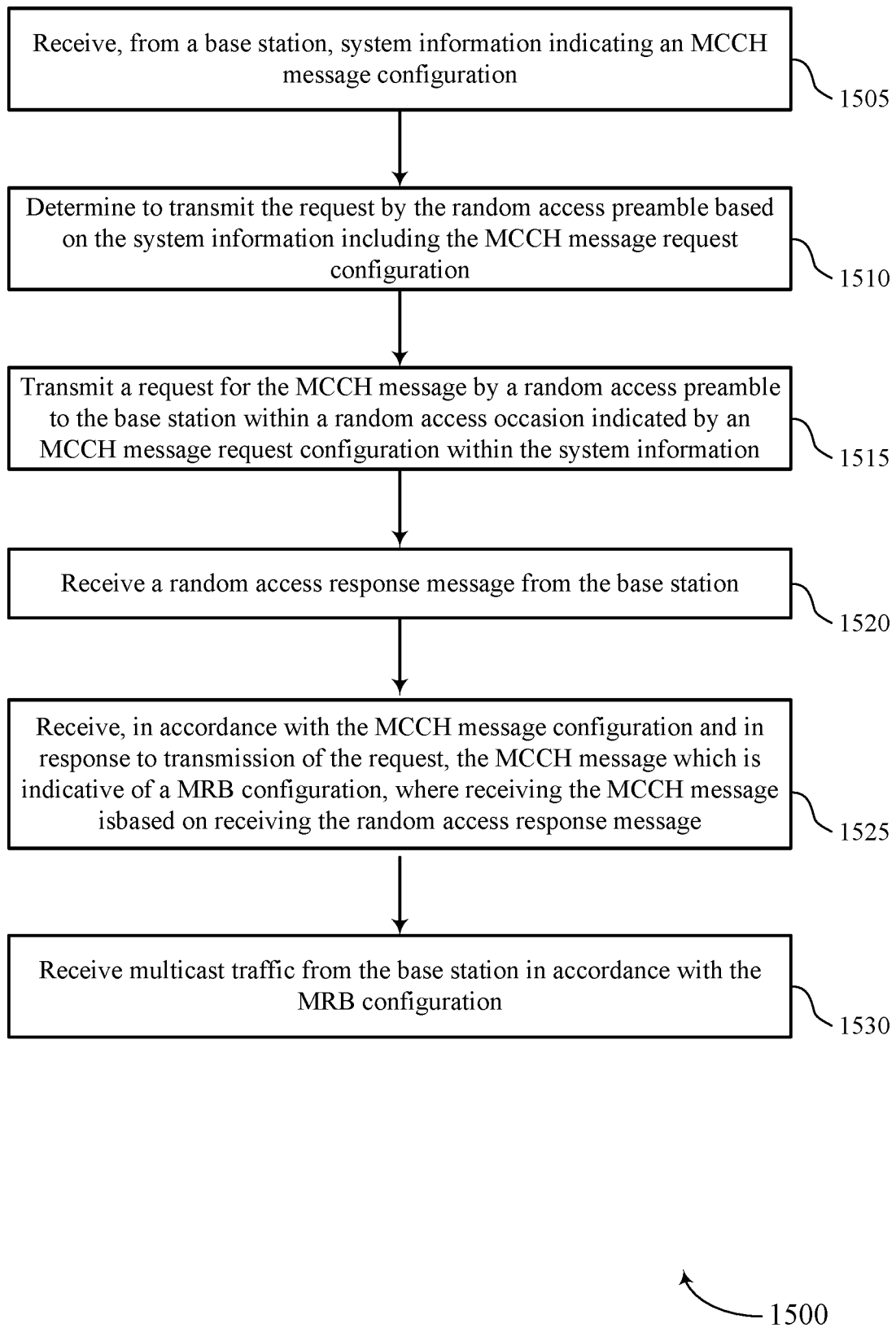

FIG. 15 shows a flowchart illustrating a method 1500 that supports on-demand MCCH messages in accordance with aspects of the present disclosure. The operations of method 1500 may be implemented by a UE 115 or its components as described herein. For example, the operations of method 1500 may be performed by a UE Coding Manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, system information indicating a MCCH message configuration. The operations of 1505 may be performed according to the methods described herein. In some examples, aspects of the operations of 1505 may be performed by a system information receiver as described with reference to FIGS. 6 through 9.

At 1510, the UE may determine to transmit the request by the random access preamble based on the system information including the MCCH message request configuration. The operations of 1510 may be performed according to the methods described herein. In some examples, aspects of the operations of 1510 may be performed by a request transmitter as described with reference to FIGS. 6 through 9.

At 1515, the UE may transmit, to the base station, a request for a MCCH message by a random access preamble to the base station within a random access occasion indicated by a MCCH message request configuration within the system information. The operations of 1535 may be performed according to the methods described herein. In some examples, aspects of the operations of 1535 may be performed by a request transmitter as described with reference to FIGS. 6 through 9.

At 1520, the UE may receive a RAR message from the base station, where receiving the MCCH message is based on receiving the RAR message. The operations of 1520 may be performed according to the methods described herein. In some examples, aspects of the operations of 1520 may be performed by a MCCH message manager as described with reference to FIGS. 6 through 9.

At 1525, the UE may receive, in accordance with the MCCH message configuration and in response to transmission of the request, the MCCH message which is indicative of a MRB configuration. The operations of 1525 may be performed according to the methods described herein. In some examples, aspects of the operations of 1525 may be performed by a MCCH message receiver as described with reference to FIGS. 6 through 9.

At 1530, the UE may receive multicast traffic from the base station in accordance with the MRB configuration. The operations of 1530 may be performed according to the methods described herein. In some examples, aspects of the operations of 1530 may be performed by a multicast traffic receiver as described with reference to FIGS. 6 through 9.

Figure 16:
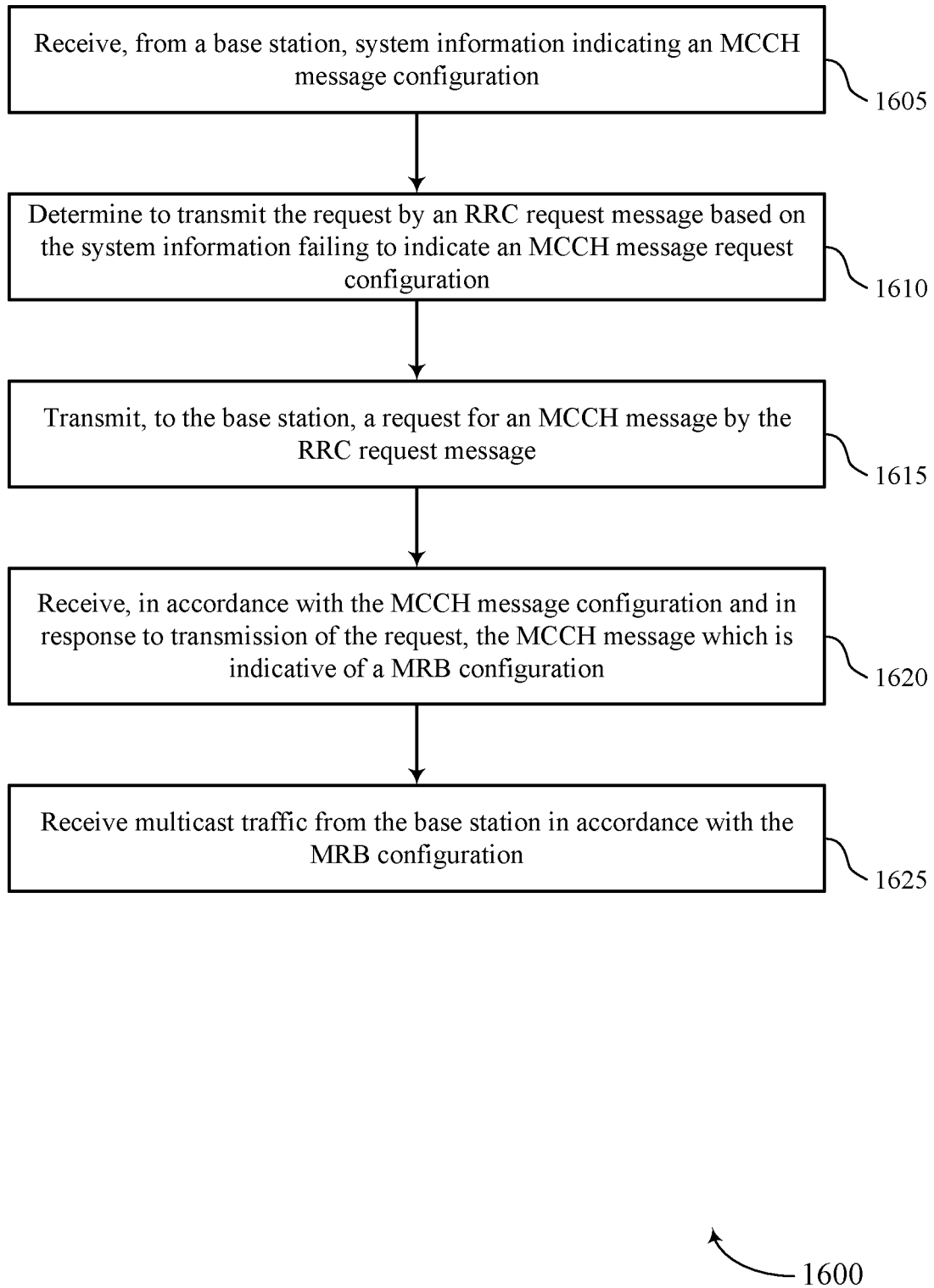

FIG. 16 shows a flowchart illustrating a method 1600 that supports on-demand MCCH messages in accordance with aspects of the present disclosure. The operations of method 1600 may be implemented by a UE 115 or its components as described herein. For example, the operations of method 1600 may be performed by a UE Coding Manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, system information indicating a MCCH message configuration. The operations of 1605 may be performed according to the methods described herein. In some examples, aspects of the operations of 1605 may be performed by a system information receiver as described with reference to FIGS. 6 through 9.

At 1610, the UE may determine to transmit the request by the RRC request message based on an absence of an MCCH message request configuration within the SIB. The operations of 1610 may be performed according to the methods described herein. In some examples, aspects of the operations of 1610 may be performed by a request transmitter as described with reference to FIGS. 6 through 9.

At 1615, the UE may transmit, to the base station, a request for a MCCH message by a RRC request message. The operations of 1630 may be performed according to the methods described herein. In some examples, aspects of the operations of 1630 may be performed by a request transmitter as described with reference to FIGS. 6 through 9.

At 1620, the UE may receive, in accordance with the MCCH message configuration and in response to transmission of the request, the MCCH message which is indicative of a MRB configuration. The operations of 1620 may be performed according to the methods described herein. In some examples, aspects of the operations of 1620 may be performed by a MCCH message receiver as described with reference to FIGS. 6 through 9.

At 1625, the UE may receive multicast traffic from the base station in accordance with the MRB configuration. The operations of 1625 may be performed according to the methods described herein. In some examples, aspects of the operations of 1625 may be performed by a multicast traffic receiver as described with reference to FIGS. 6 through 9.

Figure 17:
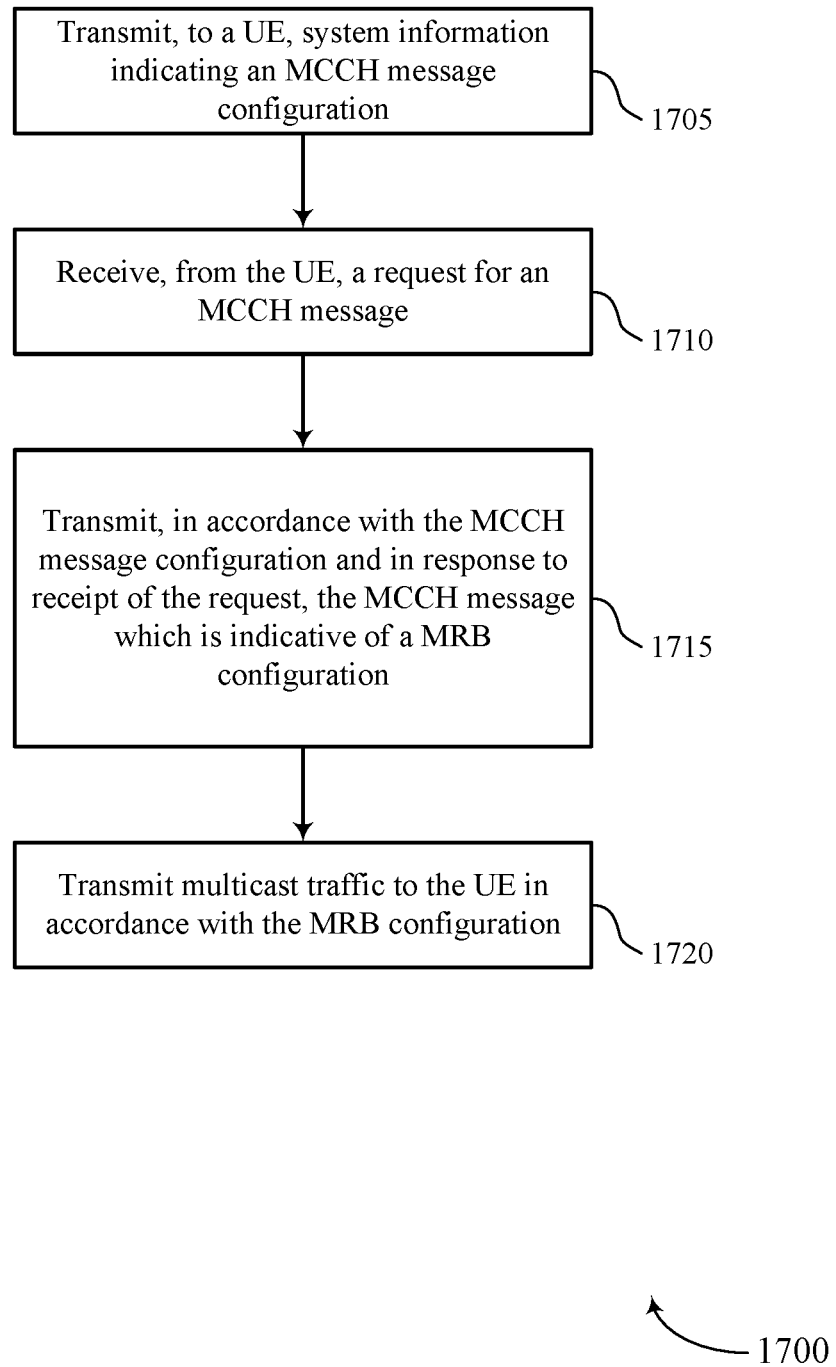

FIG. 17 shows a flowchart illustrating a method 1700 that supports on-demand MCCH messages in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may transmit, to a UE, system information indicating a MCCH message configuration. The operations of 1705 may be performed according to the methods described herein. In some examples, aspects of the operations of 1705 may be performed by a system information transmitter as described with reference to FIGS. 10 through 13.

At 1710, the base station may receive, from the UE, a request for a MCCH message. The operations of 1710 may be performed according to the methods described herein. In some examples, aspects of the operations of 1710 may be performed by a MCCH request receiver as described with reference to FIGS. 10 through 13.

At 1715, the base station may transmit, in accordance with the MCCH message configuration and in response to receipt of the request, the MCCH message which is indicative of a MRB configuration. The operations of 1715 may be performed according to the methods described herein. In some examples, aspects of the operations of 1715 may be performed by a MCCH message transmitter as described with reference to FIGS. 10 through 13.

At 1720, the base station may transmit multicast traffic to the UE in accordance with the MRB configuration. The operations of 1720 may be performed according to the methods described herein. In some examples, aspects of the operations of 1720 may be performed by a multicast traffic transmitter as described with reference to FIGS. 10 through 13.

Figure 18:
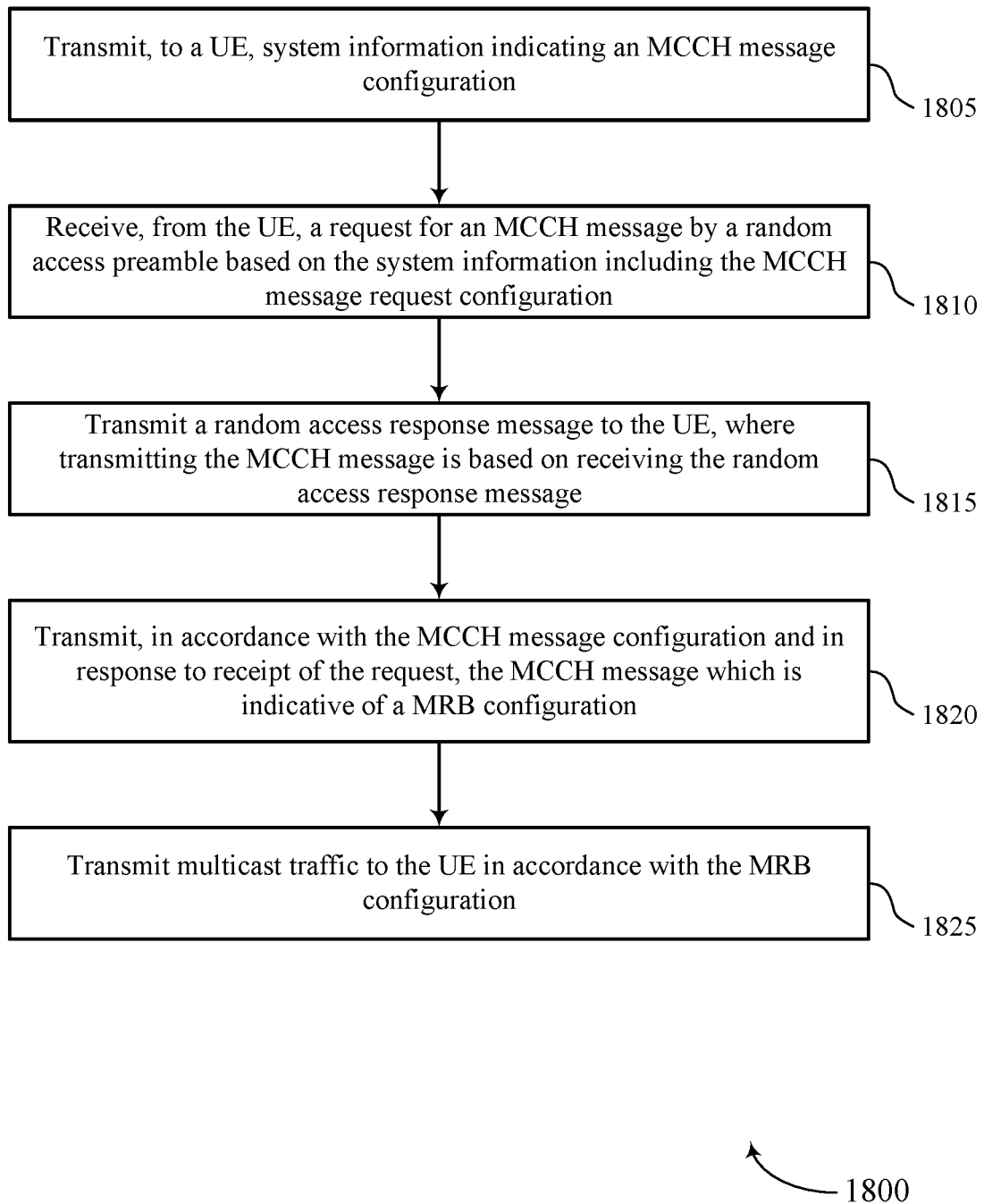

FIG. 18 shows a flowchart illustrating a method 1800 that supports on-demand MCCH messages in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may transmit, to a UE, system information indicating a MCCH message configuration. The operations of 1805 may be performed according to the methods described herein. In some examples, aspects of the operations of 1805 may be performed by a system information transmitter as described with reference to FIGS. 10 through 13.

At 1810, the base station may receive, from the UE, a request for a MCCH message by a random access preamble from the UE within a random access occasion indicated by a MCCH message request configuration within the system information. The operations of 1830 may be performed according to the methods described herein. In some examples, aspects of the operations of 1830 may be performed by a MCCH request receiver as described with reference to FIGS. 10 through 13.

At 1815, the base station may transmit a RAR message to the UE, where transmitting the MCCH message is based on receiving the RAR message. The operations of 1815 may be performed according to the methods described herein. In some examples, aspects of the operations of 1815 may be performed by a RAR transmitter as described with reference to FIGS. 10 through 13.

At 1820, the base station may transmit, in accordance with the MCCH message configuration and in response to receipt of the request, the MCCH message which is indicative of a MRB configuration. The operations of 1820 may be performed according to the methods described herein. In some examples, aspects of the operations of 1820 may be performed by a MCCH message transmitter as described with reference to FIGS. 10 through 13.

At 1825, the base station may transmit multicast traffic to the UE in accordance with the MRB configuration. The operations of 1825 may be performed according to the methods described herein. In some examples, aspects of the operations of 1825 may be performed by a multicast traffic transmitter as described with reference to FIGS. 10 through 13.

Figure 19:
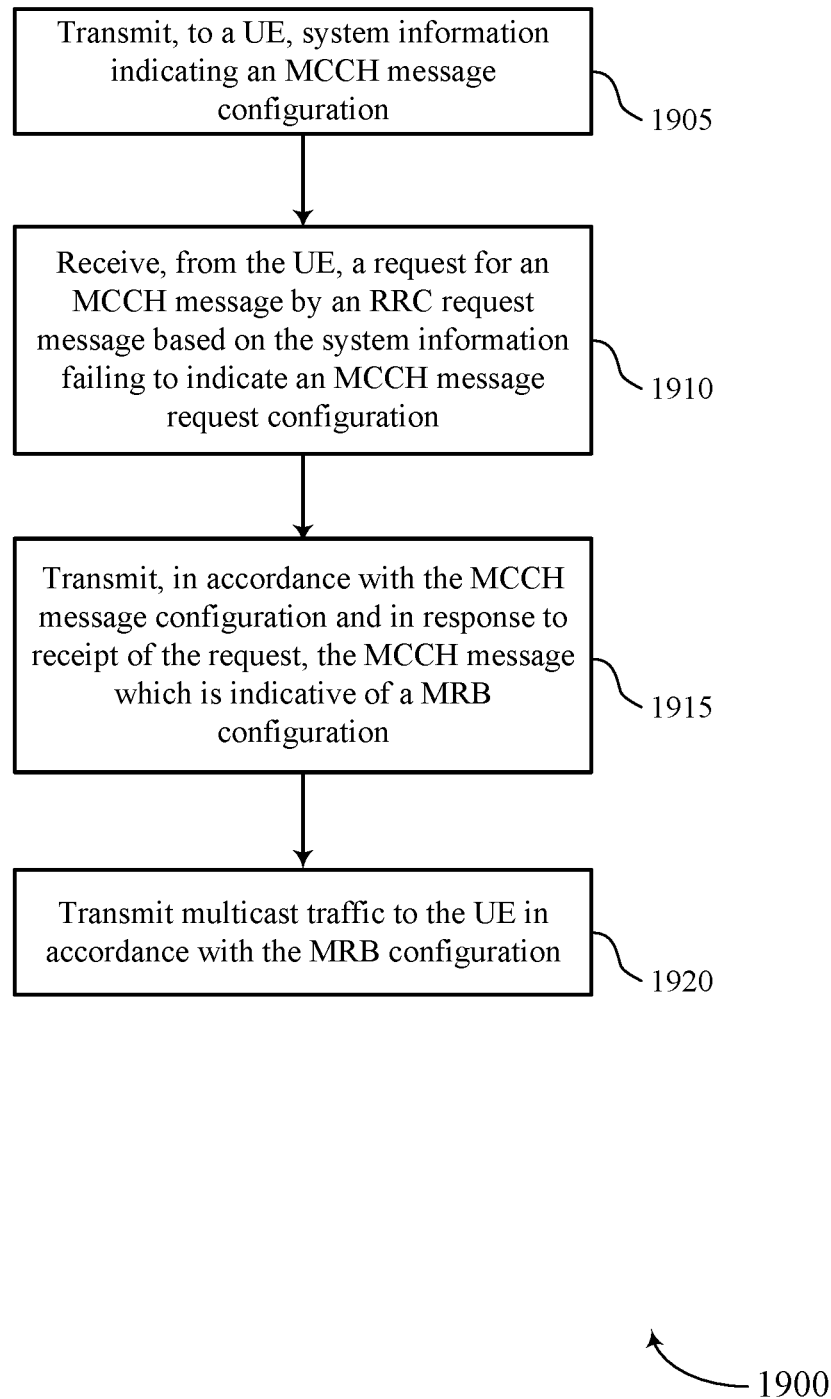

FIG. 19 shows a flowchart illustrating a method 1900 that supports on-demand MCCH messages in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1905, the base station may transmit, to a UE, system information indicating a MCCH message configuration. The operations of 1905 may be performed according to the methods described herein. In some examples, aspects of the operations of 1905 may be performed by a system information transmitter as described with reference to FIGS. 10 through 13.

At 1910, the base station may receive, from the UE, a request for a MCCH message by a RRC request message. The operations of 1925 may be performed according to the methods described herein. In some examples, aspects of the operations of 1925 may be performed by a MCCH request receiver as described with reference to FIGS. 10 through 13.

At 1915, the base station may transmit, in accordance with the MCCH message configuration and in response to receipt of the request, the MCCH message which is indicative of a MRB configuration. The operations of 1915 may be performed according to the methods described herein. In some examples, aspects of the operations of 1915 may be performed by a MCCH message transmitter as described with reference to FIGS. 10 through 13.

At 1920, the base station may transmit multicast traffic to the UE in accordance with the MRB configuration. The operations of 1920 may be performed according to the methods described herein. In some examples, aspects of the operations of 1920 may be performed by a multicast traffic transmitter as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of examples of the present disclosure:

Example 1: A method for wireless communication at a user equipment (UE), comprising: receiving, from a base station, system information indicating a multicast control channel message configuration; transmitting, to the base station, a request for a multicast control channel message; receiving, in accordance with the multicast control channel message configuration and in response to transmission of the request, the multicast control channel message which is indicative of a multicast service radio bearer configuration; and receiving multicast traffic from the base station in accordance with the multicast service radio bearer configuration.

Example 2: The method of example 1, wherein transmitting the request for the multicast control channel message further comprises: transmitting the request by a random access preamble to the base station within a random access occasion indicated by a multicast control channel message request configuration within the system information.

Example 3: The method of example 2, further comprising: receiving a random access response message from the base station, wherein receiving the multicast control channel message is based at least in part on receiving the random access response message.

Example 4: The method of any one of examples 2 through 3, further comprising: determining to transmit the request by the random access preamble based at least in part on the system information comprising the multicast control channel message request configuration.

Example 5: The method of any one of examples 1 through 4, wherein transmitting the request for the multicast control channel message further comprises: transmitting the request by a radio resource control request message.

Example 6: The method of example 5, wherein the radio resource control request message is included within a radio resource control system information request, a radio resource control multicast control channel request, or a payload of a first random access message of a two-step random access procedure.

Example 7: The method of any one of examples 5 through 6, wherein receiving the multicast control channel message further comprises: receiving the multicast control channel message by a radio resource control configuration message responsive to the radio resource control request message.

Example 8: The method of any one of examples 5 through 7, further comprising: determining to transmit the request by the radio resource control request message based at least in part on an absence of a multicast control channel message request configuration within the system information.

Example 9: The method of any one of examples 1 through 8, wherein: the system information indicates a multicast control channel message request configuration; and transmitting the request further comprises transmitting the request in accordance with the multicast control channel message request configuration.

Example 10: The method of example 9, wherein the multicast control channel message request configuration comprises at least one of an indication of a time period for transmitting the request or resources for transmitting the request.

Example 11: The method of any one of examples 1 through 9, further comprising: monitoring a physical downlink control channel for the multicast control channel message in accordance with the multicast control channel message configuration, wherein receiving the multicast control channel message is based at least in part on monitoring the physical downlink control channel.

Example 12: The method of example 11, wherein monitoring the physical downlink control channel further comprises: monitoring a control resource set of the physical downlink control channel indicated by the system information.

Example 13: The method of example 12, wherein the control resource set is associated with a monitoring time window, a monitoring period, a monitoring offset, or a combination thereof.

Example 14: The method of any one of examples 1 through 13, wherein the multicast control channel message is associated with a set of delay sensitive multicast service radio bearer configurations including the multicast service radio bearer configuration.

Example 15: The method of any one of examples 1 through 14, wherein: the multicast control channel message is associated with a set of multicast service radio bearer configurations that are delay insensitive; and the set of multicast service radio bearer configurations comprises the multicast service radio bearer configuration.

Example 16: The method of any one of examples 1 through 15, wherein: transmitting the request for the multicast control channel message is based at least in part on the system information indicating that the multicast control channel message is to be received on-demand.

Example 17: The method of any one of examples 1 through 16, further comprising: determining a service group associated with the multicast traffic, wherein receiving the multicast control channel message is based at least in part on the determined service group.

Example 18: The method of example 17, wherein determining the service group further comprises: determining a service group identifier associated with the service group based at least in part on a multicast service radio bearer context or a multicast broadcast service identifier.

Example 19: The method of any one of examples 1 through 18, wherein the multicast control channel message includes both an on-demand multicast control channel message and a periodic multicast control channel message.

Example 20: The method of any one of examples 1 through 19, further comprising: performing a cell reselection procedure from a first base station to a second base station, wherein the base station is the first base station; determining that the second base station transmits the multicast traffic in accordance with the multicast service radio bearer configuration based at least in part on a same area identifier being associated with a first multicast control channel message and a second multicast control channel message associated with the second base station, wherein the multicast control channel message is the first multicast control channel message; and determining to refrain from monitoring for system information from the second base station based at least in part on determining that the second base station transmits the multicast traffic in accordance with the multicast service radio bearer configuration.

Example 21: The method of example 20, wherein the system information comprises an indication of the area identifier.

Example 22: The method of any one of examples 1 through 21, further comprising: determining to perform a cell reselection procedure from a first base station, wherein the base station is a second base station; receiving an initial multicast control message from the first base station based at least in part on determining to perform the cell reselection procedure; determining that the second base station transmits the multicast traffic based at least in part on the initial multicast control message; and performing the cell reselection procedure from the first base station to the second base station based at least in part on determining that the second base station transmits the multicast traffic, wherein receiving the system information is based at least in part on performing the cell reselection procedure.

Example 23: The method of any one of examples 1 through 22, wherein: receiving the system information is based at least in part on the UE performing a cell reselection procedure, the UE performing a cell selection procedure, the UE performing a handover procedure, a change associated with the multicast control channel message, or a combination thereof.

Example 24: The method of any one of examples 1 through 23, wherein the multicast control channel message configuration comprises at least one of an indication of a search space associated with the multicast control channel message or a time period for receiving the multicast control channel message.

Example 25: The method of any one of examples 1 through 24, wherein: the multicast service radio bearer configuration is a multicast/broadcast service radio bearer configuration; and the multicast traffic is multicast/broadcast traffic.

Example 26: The method of any one of examples 1 through 25, wherein the multicast control channel message configuration comprises an indication of a repetition period of the multicast control channel message, an identifier associated with the multicast traffic, one or more slots associated with the multicast control channel message, a modification period associated with the multicast control channel message, a new service start, or a combination thereof.

Example 27: A method for wireless communication at a base station, comprising: transmitting, to a user equipment (UE), system information indicating a multicast control channel message configuration; receiving, from the UE, a request for a multicast control channel message; transmitting, in accordance with the multicast control channel message configuration and in response to receipt of the request, the multicast control channel message which is indicative of a multicast service radio bearer configuration; and transmitting multicast traffic to the UE in accordance with the multicast service radio bearer configuration.

Example 28: The method of example 27, wherein receiving the request for the multicast control channel message further comprises: receiving the request by a random access preamble from the UE within a random access occasion indicated by a multicast control channel message request configuration within the system information.

Example 29: The method of example 28, further comprising: transmitting a random access response message to the UE, wherein transmitting the multicast control channel message is based at least in part on receiving the random access response message.

Example 30: The method of any one of examples 28 through 29, wherein the request is received by the random access preamble based at least in part on the system information comprising the multicast control channel message request configuration.

Example 31: The method of any one of examples 27 through 30, wherein receiving the request for the multicast control channel message further comprises: receiving the request by a radio resource control request message.

Example 32: The method of example 31, wherein the radio resource control request message is included within a radio resource control connection request or within a payload of a first random access message of a two-step random access procedure.

Example 33: The method of any one of examples 31 through 32, wherein transmitting the multicast control channel message further comprises: transmitting the multicast control channel message by a radio resource control configuration message responsive to the radio resource control request message.

Example 34: The method of any one of examples 31 through 33, wherein the request is received by the radio resource control request message based at least in part on an absence of a multicast control channel message request configuration within the system information.

Example 35: The method of any one of examples 27 through 34, wherein: the system information indicates a multicast control channel message request configuration; and receiving the request further comprises receiving the request in accordance with the multicast control channel message request configuration.

Example 36: The method of example 35, wherein the multicast control channel message request configuration comprises at least one of an indication of a time period for transmission by the UE of the request or resources for transmission by the UE of the request.

Example 37: The method of any one of examples 27 through 36, wherein transmitting the multicast control channel message further comprises: transmitting the multicast control channel message by a physical downlink control channel in accordance with the multicast control channel message configuration.

Example 38: The method of example 37, wherein transmitting the multicast control channel message by the physical downlink control channel further comprises: transmitting the multicast control channel message within a control resource set indicated by the system information.

Example 39: The method of any one of examples 37 through 38, wherein the control resource set is associated with a monitoring time window, a monitoring period, a monitoring offset, or a combination thereof.

Example 40: The method any one of examples 27 through 39, wherein: the multicast control channel message is a first multicast control channel message; and the first multicast control channel message is associated with a first set of multicast service radio bearer configurations comprising at least the multicast service radio bearer configuration.

Example 41: The method of example 40, further comprising: transmitting a second multicast control channel message associated with a second set of multicast service radio bearer configurations, wherein one of the first set of multicast service radio bearer configurations or the second set of multicast service radio bearer configurations are delay sensitive.

Example 42: The method of any one of examples 27 through 41, wherein: receiving the request for the multicast control channel message is based at least in part on the system information indicating that the multicast control channel message is to be transmitted on-demand.

Example 43: The method of any one of examples 27 through 42, further comprising: determining a service group associated with the multicast traffic, wherein transmitting the multicast control channel message is based at least in part on the determined service group.

Example 44: The method of example 43, wherein determining the service group further comprises: determining a service group identifier associated with the service group based at least in part on a multicast service radio bearer context or a multicast broadcast service identifier.

Example 45: The method any one of examples 27 through 44, wherein the multicast control channel message includes both an on-demand multicast control channel message and a periodic multicast control channel message.

Example 46: The method of any one of examples 27 through 45, wherein: transmitting the system information is based at least in part on the UE performing a cell reselection procedure, the UE performing a cell selection procedure, the UE performing a handover procedure, a change associated with the multicast control channel message, or a combination thereof.

Example 47: The method of any one of examples 27 through 46, wherein the multicast control channel message configuration comprises at least one of an indication of a search space associated with the multicast control channel message or a time period for receiving the multicast control channel message.

Example 48: The method of any one of examples 27 through 47, wherein: the multicast service radio bearer configuration is a multicast/broadcast service radio bearer configuration; and the multicast traffic is multicast/broadcast traffic.

Example 49: The method of any one of examples 27 through 48, wherein the multicast control channel message configuration comprises an indication of a repetition period of the multicast control channel message, an identifier associated with the multicast traffic, one or more slots associated with the multicast control channel message, a modification period associated with the multicast control channel message, a new service start, or a combination thereof.

Example 50: An apparatus for wireless communications at a UE comprising at least one means for performing a method of any one of examples 1 through 26.

Example 51: An apparatus for wireless communications at a UE comprising: a processor; memory coupled to the processor; and instructions stored in the memory and executable to perform a method of any one of examples 1 through 26.

Example 52: A non-transitory computer-readable medium storing code for wireless communications at a UE, the code comprising instructions executable by a processor to perform a method of any one of examples 1 through 26.

Example 53: An apparatus for wireless communications at a base station comprising at least one means for performing a method of any one of examples 27 through 49.

Example 54: Example 43: An apparatus for wireless communication at a base station, comprising: a processor; memory coupled to the processor; and instructions stored in the memory and executable to perform a method of any one of examples 27 through 49.

Example 55: A non-transitory computer-readable medium storing code for wireless communications at a base station, the code comprising instructions executable by a processor to perform a method of any one of examples 27 through 49.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   receiving, from a network device, system information indicating a multicast control channel message configuration and a multicast control channel message request configuration;
   transmitting, to the network device after receiving the system information, a request for a multicast control channel message in accordance with the multicast control channel message request configuration indicated in the system information;
   receiving the multicast control channel message in accordance with the multicast control channel message configuration and in response to transmission of the request, wherein the multicast control channel message is indicative of a multicast service radio bearer configuration; and
   receiving multicast traffic from the network device in accordance with the multicast service radio bearer configuration.

2. The method of claim 1, wherein transmitting the request for the multicast control channel message further comprises:
   determining to transmit the request by a random access preamble based at least in part on the system information comprising the multicast control channel message request configuration;
   transmitting the request by the random access preamble to the network device within a random access occasion indicated by the multicast control channel message request configuration within the system information; and
   receiving a random access response message from the network device, wherein receiving the multicast control channel message is based at least in part on receiving the random access response message.

3. The method of claim 1, wherein transmitting the request for the multicast control channel message further comprises:
   transmitting the request by a radio resource control request message, wherein the radio resource control request message is included within a radio resource control system information request, a radio resource control multicast control channel request, or a payload of a first random access message of a two-step random access procedure.

4. The method of claim 3, wherein:
   receiving the multicast control channel message further comprises receiving the multicast control channel message by a radio resource control configuration message responsive to the radio resource control request message.

5. The method of claim 1, wherein:
the system information indicates the multicast control channel message request configuration comprising at least one of an indication of a time period for transmitting the request or resources for transmitting the request; and
transmitting the request further comprises transmitting the request in accordance with the multicast control channel message request configuration.

6. The method of claim 1, further comprising:
monitoring a physical downlink control channel for the multicast control channel message in accordance with the multicast control channel message configuration, wherein receiving the multicast control channel message is based at least in part on monitoring the physical downlink control channel; and
monitoring a control resource set of the physical downlink control channel indicated by the system information, wherein the control resource set is associated with a monitoring time window, a monitoring period, a monitoring offset, or a combination thereof.

7. The method of claim 1, wherein the multicast control channel message is associated with a set of delay sensitive multicast service radio bearer configurations including the multicast service radio bearer configuration.

8. The method of claim 1, wherein:
the multicast control channel message is associated with a set of multicast service radio bearer configurations that are delay insensitive; and
the set of multicast service radio bearer configurations comprises the multicast service radio bearer configuration.

9. The method of claim 1, wherein:
transmitting the request for the multicast control channel message is based at least in part on the system information indicating that the multicast control channel message is to be received on-demand.

10. The method of claim 1, further comprising:
determining a service group associated with the multicast traffic, wherein receiving the multicast control channel message is based at least in part on the determined service group; and
determining a service group identifier associated with the service group based at least in part on a multicast service radio bearer context or a multicast broadcast service identifier.

11. The method of claim 1, wherein the multicast control channel message includes both an on-demand multicast control channel message and a periodic multicast control channel message.

12. The method of claim 1, further comprising:
performing a cell reselection procedure from a first network device to a second network device, wherein the network device is the first network device;
determining that the second network device transmits the multicast traffic in accordance with the multicast service radio bearer configuration based at least in part on a same area identifier being associated with a first multicast control channel message and a second multicast control channel message associated with the second network device, wherein the multicast control channel message is the first multicast control channel message; and
determining to refrain from monitoring for the system information from the second network device based at least in part on determining that the second network device transmits the multicast traffic in accordance with the multicast service radio bearer configuration, wherein the system information comprises an indication of the same area identifier.

13. The method of claim 1, further comprising:
determining to perform a cell reselection procedure from a first network device, wherein the network device is a second network device;
receiving an initial multicast control message from the first network device based at least in part on determining to perform the cell reselection procedure;
determining that the second network device transmits the multicast traffic based at least in part on the initial multicast control message; and
performing the cell reselection procedure from the first network device to the second network device based at least in part on determining that the second network device transmits the multicast traffic, wherein receiving the system information is based at least in part on performing the cell reselection procedure.

14. The method of claim 1, wherein:
receiving the system information is based at least in part on the UE performing a cell reselection procedure, the UE performing a cell selection procedure, the UE performing a handover procedure, a change associated with the multicast control channel message, or a combination thereof.

15. The method of claim 1, wherein the multicast control channel message configuration comprises an indication of a search space associated with the multicast control channel message, a time period for receiving the multicast control channel message, a repetition period of the multicast control channel message, an identifier associated with the multicast traffic, one or more slots associated with the multicast control channel message, a modification period associated with the multicast control channel message, a new service start, or a combination thereof.

16. The method of claim 1, wherein:
the multicast service radio bearer configuration is a multicast/broadcast service radio bearer configuration; and
the multicast traffic is multicast/broadcast traffic.

17. A method for wireless communication at a network device, comprising:
transmitting, to a user equipment (UE), system information indicating a multicast control channel message configuration and a multicast control channel message request configuration;
receiving, from the UE after transmitting the system information, a request for a multicast control channel message in accordance with the multicast control channel message request configuration indicated in the system information;
transmitting the multicast control channel message in accordance with the multicast control channel message configuration and in response to receipt of the request, wherein the multicast control channel message is indicative of a multicast service radio bearer configuration; and
transmitting multicast traffic to the UE in accordance with the multicast service radio bearer configuration.

18. The method of claim 17, wherein receiving the request for the multicast control channel message further comprises:
receiving the request by a random access preamble from the UE within a random access occasion indicated by the multicast control channel message request configuration within the system information based at least in part on the system information comprising the multicast control channel message request configuration.

19. The method of claim 18, further comprising:
transmitting a random access response message to the UE, wherein transmitting the multicast control channel message is based at least in part on transmitting the random access response message.

20. The method of claim 17, wherein receiving the request for the multicast control channel message further comprises:
receiving the request by a radio resource control request message, wherein the radio resource control request message is included within a radio resource control connection request or within a payload of a first random access message of a two-step random access procedure.

21. The method of claim 20, wherein:
transmitting the multicast control channel message further comprises transmitting the multicast control channel message by a radio resource control configuration message responsive to the radio resource control request message.

22. The method of claim 17, wherein:
the system information indicates the multicast control channel message request configuration comprising at least one of an indication of a time period for transmission by the UE of the request or resources for the transmission by the UE of the request; and
receiving the request further comprises receiving the request in accordance with the multicast control channel message request configuration.

23. The method of claim 17, wherein transmitting the multicast control channel message further comprises:
transmitting the multicast control channel message by a physical downlink control channel in accordance with the multicast control channel message configuration; and
transmitting the multicast control channel message by the physical downlink control channel within a control resource set indicated by the system information, wherein the control resource set is associated with a monitoring time window, a monitoring period, a monitoring offset, or a combination thereof.

24. The method of claim 17, wherein:
the multicast control channel message is a first multicast control channel message; and
the first multicast control channel message is associated with a first set of multicast service radio bearer configurations comprising at least the multicast service radio bearer configuration.

25. The method of claim 24, further comprising:
transmitting a second multicast control channel message associated with a second set of multicast service radio bearer configurations, wherein one of the first set of multicast service radio bearer configurations or the second set of multicast service radio bearer configurations are delay sensitive.

26. The method of claim 17, wherein:
receiving the request for the multicast control channel message is based at least in part on the system information indicating that the multicast control channel message is to be transmitted on-demand.

27. The method of claim 17, further comprising:
determining a service group associated with the multicast traffic, wherein transmitting the multicast control channel message is based at least in part on the determined service group; and
determining a service group identifier associated with the service group based at least in part on a multicast service radio bearer context or a multicast broadcast service identifier.

28. The method of claim 17, wherein:
transmitting the system information is based at least in part on the UE performing a cell reselection procedure, the UE performing a cell selection procedure, the UE performing a handover procedure, a change associated with the multicast control channel message, or a combination thereof.

29. An apparatus for wireless communication at a user equipment (UE), comprising:
one or more processors;
memory coupled with the one or more processors; and
instructions stored in the memory and executable by the one or more processors to cause the apparatus to:
receive, from a network device, system information indicating a multicast control channel message configuration and a multicast control channel message request configuration;
transmit, to the network device after receiving the system information, a request for a multicast control channel message in accordance with the multicast control channel message request configuration indicated in the system information;
receive the multicast control channel message in accordance with the multicast control channel message configuration and in response to transmission of the request, wherein the multicast control channel message is indicative of a multicast service radio bearer configuration; and
receive multicast traffic from the network device in accordance with the multicast service radio bearer configuration.

30. An apparatus for wireless communication at a network device, comprising:
one or more processors;
memory coupled with the one or more processors; and
instructions stored in the memory and executable by the one or more processors to cause the apparatus to:
transmit, to a user equipment (UE), system information indicating a multicast control channel message configuration and a multicast control channel message request configuration;
receive, from the UE after transmitting the system information, a request for a multicast control channel message in accordance with the multicast control channel message request configuration indicated in the system information;
transmit the multicast control channel message in accordance with the multicast control channel message configuration and in response to receipt of the request, wherein the multicast control channel message is indicative of a multicast service radio bearer configuration; and
transmit multicast traffic to the UE in accordance with the multicast service radio bearer configuration.

* * * * *